United States Patent
Furukawa et al.

(10) Patent No.: US 8,547,041 B2
(45) Date of Patent: Oct. 1, 2013

(54) POWER CONVERSION DEVICE

(75) Inventors: Kimihisa Furukawa, Hitachi (JP);
Hideki Miyazaki, Hitachi (JP);
Shigeyuki Yoshihara, Hitachinaka (JP);
Yuichiro Takamune, Naka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 377 days.

(21) Appl. No.: 12/846,535

(22) Filed: Jul. 29, 2010

(65) Prior Publication Data
US 2011/0025240 A1 Feb. 3, 2011

(30) Foreign Application Priority Data

Jul. 30, 2009 (JP) ................. 2009-178118

(51) Int. Cl.
*H02P 21/00* (2006.01)
(52) U.S. Cl.
USPC .................... 318/400.02; 318/811
(58) Field of Classification Search
USPC .............. 318/400.02, 727, 599, 811, 801, 318/802, 432, 434
See application file for complete search history.

(56) References Cited

U.S. PATENT DOCUMENTS

| | | | | |
|---|---|---|---|---|
| 4,575,668 | A * | 3/1986 | Baker | 318/811 |
| 6,005,783 | A * | 12/1999 | Xue et al. | 363/36 |
| 6,690,137 | B2 * | 2/2004 | Iwaji et al. | 318/700 |
| 6,710,495 | B2 * | 3/2004 | Lipo et al. | 310/184 |
| 6,984,960 | B2 * | 1/2006 | Stancu et al. | 318/801 |
| 7,034,493 | B2 * | 4/2006 | Yoshimoto et al. | 318/629 |
| 7,161,323 | B2 * | 1/2007 | Ajima et al. | 318/629 |
| 2008/0218111 | A1 * | 9/2008 | Okamura | 318/453 |
| 2009/0160376 | A1 * | 6/2009 | Yamada | 318/400.02 |
| 2009/0322265 | A1 | 12/2009 | Shoda et al. | |

FOREIGN PATENT DOCUMENTS

| | | |
|---|---|---|
| JP | 62-239868 A | 10/1987 |
| JP | 10-4687 A | 1/1998 |
| JP | 2000-278982 A | 10/2000 |
| JP | 2001-119898 A | 4/2001 |
| WO | WO 2007/114109 A1 | 10/2007 |

OTHER PUBLICATIONS

Hasmukh S. Patel et al., "Generalized Techniques of Harmonic Elimination and Voltage Control in Thyristor Inverters: Part II—Voltage Control Techniques", IEEE Transactions on Industry Applications, Sep./Oct. 1974, pp. 666-673, vol. 1A-10, No. 5.

Hasmukh S. Patel et al., "Generalized Techniques of Harmonic Elimination and Voltage Control in Thyristor Inverters: Part I—Harmonic Elimination", IEEE Transactions on Industry Applications, May/Jun. 1973, pp. 310-317, vol. 1A-9, No. 3.

Japanese Office Action dated Mar. 12, 2013 with English translation (Eight (8) pages).

* cited by examiner

*Primary Examiner* — Rina Duda
(74) *Attorney, Agent, or Firm* — Crowell & Moring LLP

(57) ABSTRACT

A power conversion device comprises a power conversion unit of a three phase full bridge type including upper arm switching devices and lower arm switching devices, and a controller that outputs drive signals to these switching devices. This power conversion device forms alternately a first interval in which the upper arm switching devices and the lower arm switching devices are switched to ON for different phases, and a second interval in which, for all phases, either the upper arm switching devices or the lower arm switching devices are switched to ON, according to electrical angle.

11 Claims, 15 Drawing Sheets

(EXAMPLE) 5TH ORDER HARMONIC COMPONENT IS ELIMINATED

REGIONS WHERE 5TH ORDER HARMONIC COMPONENT IS SUBTRACTED FROM RECTANGULAR WAVE

FIG.5

When the voltage $f(\omega t)$ between two lines is Fourier expanded $f(\omega t) = A0 + \Sigma (An \cdot \cos(n\omega t) + Bn \cdot \sin(n\omega t))$  n=1, 2, 3···

$An = 1/\pi \int f(\omega t) \cos(n\omega t) d(\omega t)$ $Bn = 1/\pi \int f(\omega t) \sin(n\omega t) d(\omega t)$

THE A0=0 DIRECT CURRENT COMPONENT IS "0" AS A ±AVERAGE

(1) HALF WAVE SYMMETRIC: $f(\omega t) = -f(\omega t + \pi)$

※POSITIVE AND NEGATIVE ARE INTERCHANGED BY A HALF CYCLE SHIFT OF $\pi$

※THE EVEN ORDER HARMONIC COMPONENTS (n=2, 4, 6···) ARE ELIMINATED.

} HOW THE HARMONIC COMPONENTS ARE ELIMINATED

(2) ODD SYMMETRIC: $f(\omega t) = f(\pi - \omega t)$

※THE WAVEFORM IS SYMMETRIC ABOUT $\pi/2$ AS A CENTER.
    (COSINE TERMS ARE ELIMINATED,
     SINCE IT IS AN ODD FUNCTION)

FROM (1) AND (2), THE EQUATION BELOW HOLDS:

$'f(\omega t) = \Sigma Bn \cdot \sin(n\omega t)$  n=1, 3, 5···

Bn IS THE AMPLITUDE OF THE n-TH ORDER HARMONIC COMPONENT. THE HARMONIC COMPONENT CAN BE ELIMINATED WHEN A PULSE IS APPLIED AIMING AT ATTAINING A PHASE WITH Bn=0

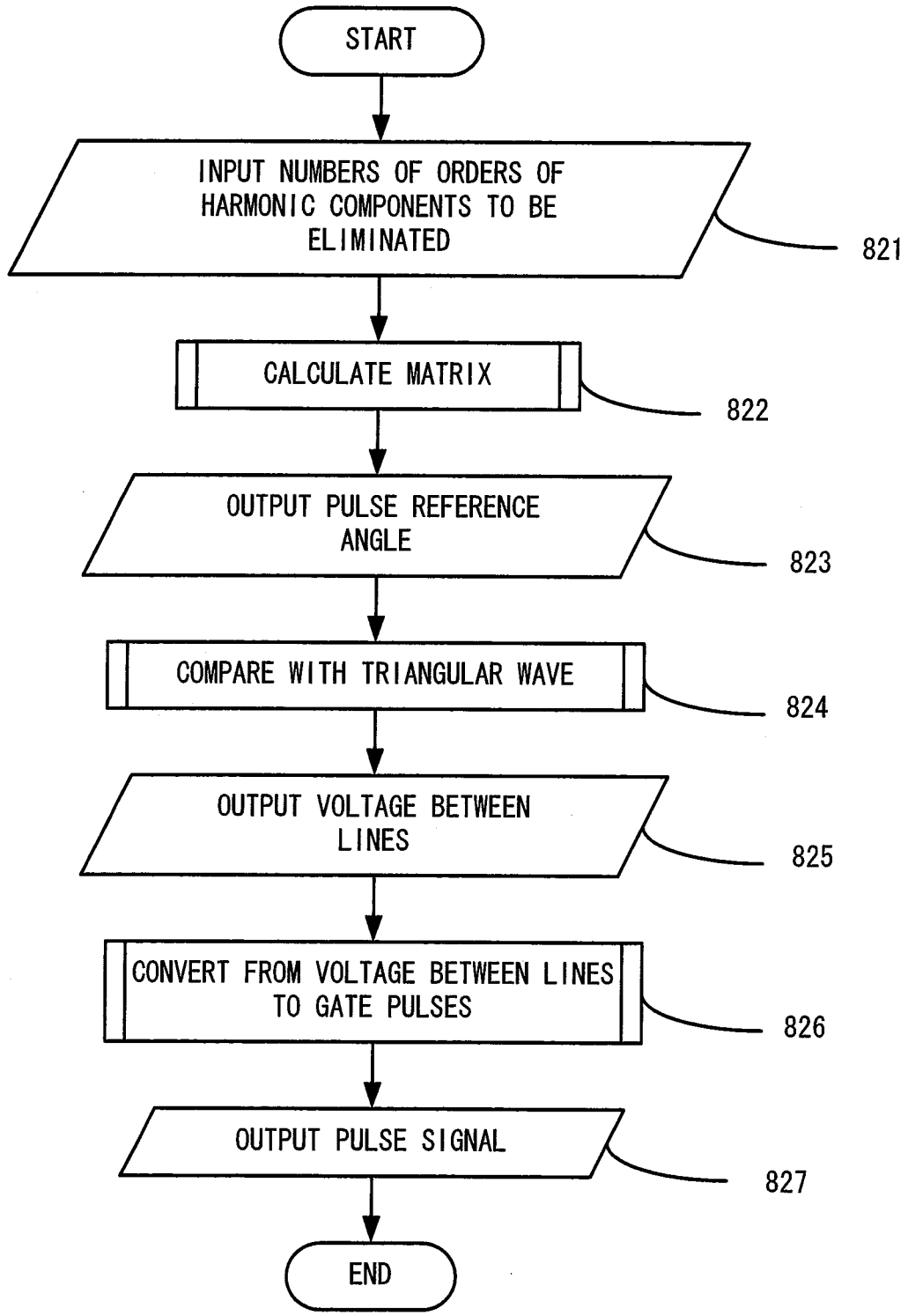

FIG.12

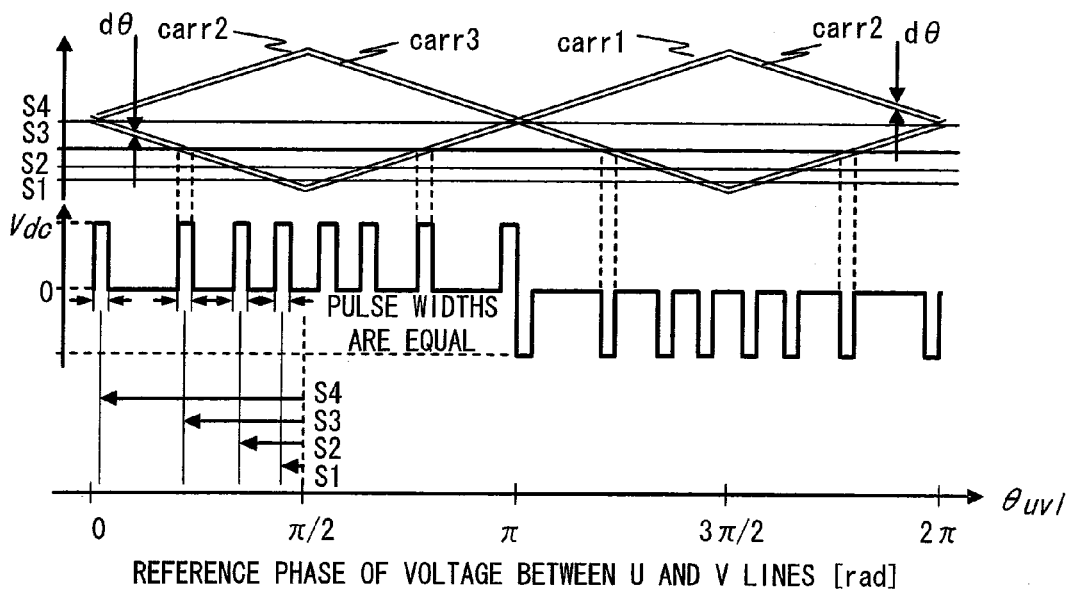

PULSE WIDTH IS DETERMINED BY DEVIATION OF carr1 AND carr2 IN VERTICAL DIRECTION (AND THE SAME FOR carr3 AND carr4)

REFERENCE PHASE OF VOLTAGE BETWEEN U AND V LINES [rad]

PULSE REFERENCE POSITIONS $S_1$, $S_2$, $S_3$, AND $S_4$ ARE COMPARED WITH TRIANGULAR WAVE OF PERIOD $2\pi$

※ $d\theta$ = carr1($\theta_{uvl}$) − carr2($\theta_{uvl}$) = carr3($\theta_{uvl}$) − carr4($\theta_{uvl}$)

PULSE WIDTH IS PROPORTIONAL TO MODULATION INDEX

FIG.14

| MODE | VOLTAGES BETWEEN LINES (NORMALIZED) | | | | PHASE TERMINAL VOLTAGES (NORMALIZED) | | |
|---|---|---|---|---|---|---|---|
| | Vuv | Vvw | Vwu | | Vu | Vv | Vw |
| 1 | 1 | 0 | -1 | → | 1 | 0 | 0 |
| 2 | 0 | 1 | -1 | → | 1 | 1 | 0 |
| 3 | -1 | 1 | 0 | → | 0 | 1 | 0 |
| 4 | -1 | 0 | 1 | → | 0 | 1 | 1 |
| 5 | 0 | -1 | 1 | → | 0 | 0 | 1 |
| 6 | 1 | -1 | 0 | → | 1 | 0 | 1 |

(EXAMPLE)

$Vu-Vv=+1$ $Vv-Vw=0$ $Vw-Vu=-1$ (EXAMPLE)

$Vu=1$   U PHASE: UPPER ARM ON / LOWER ARM OFF $Vv=0$   V PHASE: UPPER ARM OFF / LOWER ARM ON $Vw=0$   W PHASE: UPPER ARM OFF / LOWER ARM ON

THE PATTERN OF THE PHASE TERMINAL VOLTAGES (GATE PULSES) IS DIVIDED INTO MODES 1 ~ 6 AND A THREE PHASE SHORT CIRCUIT PATTERN

US 8,547,041 B2

POWER CONVERSION DEVICE

INCORPORATION BY REFERENCE

The disclosure of the following priority application is herein incorporated by reference: Japanese Patent Application No. 2009-178118 filed Jul. 30, 2009

BACKGROUND OF THE INVENTION

1. Field of the Invention

The present invention relates to a power conversion device that converts DC power to AC power, or AC power to DC power.

2. Description of Related Art

In recent years, various types of environmentally-sensitive automobiles such as electric vehicles and hybrid electric vehicles employing an electric motor as a power source have become widespread. The main characteristic of such an environmentally sensitive automobile is that it is equipped with a battery, and that its wheels are driven by torque generated by a motor that utilizes this battery as a source of power. Generally an AC electric motor such as a permanent magnet synchronous electric motor or the like is used as this driving electric motor, since this makes it possible to make the power train more compact. Furthermore, a power conversion device that converts the DC power from the battery to AC power is utilized in order to supply the DC power from the battery to such an AC electric motor. By controlling this power conversion device, it becomes possible to perform variable speed change control of the AC electric motor for powering the vehicle.

In the drive system including the electric motor, the power conversion device, and the battery that is used in this type of hybrid electric vehicle, in order for the power conversion device to fulfill its power conversion function, it includes a power conversion device circuit that includes switching devices. Power conversion from DC power to AC power, or from AC power to DC power, is performed by these switching devices repeatedly going continuous and discontinuous.

When mounted to the vehicle, such a power conversion device receives DC power from the onboard power supply, and, for example, converts this DC power into three phase AC power for supply to a rotating electrical machine for driving the vehicle (i.e., the motor). Now, in recent years, the torque that is requested from such a rotating electrical machine for vehicle driving has become much greater than was the case with earlier device configurations. Due to this, there is a tendency for the amount of power to be converted by the power conversion device to become greater. Furthermore, a power conversion device that is mounted to a vehicle is subjected to a higher temperature environment, as compared with a power conversion device that is mounted to a typical industrial machine that is installed in a workplace. Due to this, with a power conversion device for a vehicle, it is desirable to emphasize as much as possible reduction of the amount of heat generated by the power conversion device itself, as compared with the case of a power conversion device for general use. The heat that is generated by the switching devices incorporated in the power conversion device circuitry is a large proportion of the heat that is generated internally to the power conversion device as a whole. Due to this, it is desirable to reduce the heat generated in the switching devices as much as possible.

Two reasons for generation of heat in the switching devices are steady loss that takes place even while the switching devices are in the continuous state, and switching loss that takes place when the switching devices change between the discontinuous state and the continuous state. While it is difficult to reduce the amount of heat generated due to steady loss because it is determined by the load that is being output, it is possible to reduce the amount of heat generated due to switching loss by reducing the number of times that switching is performed per unit time.

Attempts to reduce switching loss have been proposed in the prior art. For example, there is a per se known method of two phase modulation for reducing the switching loss of a three phase inverter. Since with such a two phase modulation method, in accordance with its name, switching control is performed for only two of the three phases while the remaining one phase is not switched, accordingly, as compared with the sine wave PWM method, the number of times that switching is performed is approximately ⅔, so that the switching loss is ⅔ or less that of sine wave PWM.

In order to reduce the switching loss further, it is necessary to lower the carrier frequency that determines the switching frequency, but when the carrier frequency is decreased the current pulsation increases, and along with this the torque pulsation of the motor and the noise that it generates become greater. Accordingly in the prior art methods have been investigated for suppressing undesirable current pulsations while reducing the carrier frequency (for example, refer to Patent Document #1).

With the method described in Patent Document #1, PWM switching operation is determined by comparing together the magnitude of the modulated signal and the magnitude of a reference signal that is the desired value for the output voltage. At this time, in order to reduce torque pulsation of the motor, at least one harmonic component is intentionally superimposed upon the reference signal, and thereby torque pulsation at a specific frequency may be eliminated or reduced. However, sometimes it becomes difficult to reduce the torque pulsation as desired when the superimposed harmonic component and the carrier frequency approach one another, and on the contrary there is a possibility that the torque pulsation may increase.

Patent Document #1: Japanese Laid-Open Patent Publication 62-239868

Thus, an object of the present invention is to provide a power conversion device, with which it is possible to reduce torque pulsation and switching losses.

SUMMARY OF THE INVENTION

A power conversion device according to a 1st aspect of the present invention comprises: an inverter circuit that includes a plurality of switching devices each operating as an upper arm or a lower arm, and that receives DC power and generates AC power for driving a motor; a control circuit that receives a torque command for driving the motor and generates a control signal for controlling the switching devices; a driver circuit that drives the switching devices based upon the control signal from the control circuit; and a smoothing capacitor module. In this power conversion device, it is preferred that: the inverter circuit comprises upper arm and lower arm series circuits that include the switching devices in correspondence to U phase, V phase and W phase respectively, each of which is connected to the smoothing capacitor module in parallel; the control circuit generates the control signal for setting each of the switching devices to a continuous state in correspondence to an electrical angle of AC voltage for driving the motor, based upon the received torque command for the motor; the driver circuit controls switching operations of the switching devices; and, by controlling the switching operations of the switching devices, a circuit between phases of the U phase, the V phase or the W phase, to which the motor is connected as a load, is electrically connected to the smoothing capacitor module a plurality of times a half period of the AC voltage, in correspondence to the electrical angle of the AC voltage for driving the motor, and, by this connection, current is supplied to the motor that is connected as a load.

According to a 2nd aspect of the present invention, in the power conversion device according to the 1st aspect, the control circuit may receive rotational information for the motor and generate the control signal based upon the torque command and the rotational information for the motor that have been received.

According to a 3rd aspect of the present invention, in the power conversion device according to the 1st or 2nd aspect, it is preferred that the control circuit controls the switching devices so that a pattern of connection periods during which the circuit between phases connected with the motor is connected to the smoothing capacitor module is symmetric about the electrical angle of the AC voltage being 180° as a center.

According to a 4th aspect of the present invention, in the power conversion device according to any one of the 1st through 3rd aspects, the control circuit may control the switching devices so that connection periods in the half period of the AC voltage during which the circuit between phases connected with the motor is connected to the smoothing capacitor module are symmetric about the electrical angle of the AC voltage being 90° as a center.

According to a 5th aspect of the present invention, the power conversion device according to any one of the 1st through 4th aspects may further comprise a current sensor that detects current supplied from the inverter circuit to the motor. In this power conversion device, it is preferred that the control circuit generates the control signal based upon the torque command and a current value detected by the current sensor.

According to a 6th aspect of the present invention, in the power conversion device according to any one of the 1st through 5th aspects, it is preferred that: the control circuit includes a memory in which continuity information for the switching devices in correspondence to the electrical angle of the AC voltage is stored; and the control circuit reads out the continuity information for the switching devices from the memory and generates the control signal based upon the continuity information that has been read out.

According to a 7th aspect of the present invention, in the power conversion device according to any one of the 1st through 6th aspects, it is desirable that, if the torque command is increased, the control circuit generates the control signal so that connection periods during which each circuit between phases connected with the motor is connected to the smoothing capacitor module are prolonged.

According to an 8th aspect of the present invention, in the power conversion device according to any one of the 1st through 7th aspects, the inverter circuit and the smoothing capacitor module may be housed in a single cabinet.

According to a 9th aspect of the present invention, in the power conversion device according to the 8th aspect, it is preferred that the control circuit and the driver circuit are also housed in the cabinet.

According to a 10th aspect of the present invention, in the power conversion device according to the 1st aspect, the control circuit may control operations of the switching devices so that a first interval, in which all upper arms or all lower arms of the U phase, the V phase or the W phase of the inverter circuit are in continuous states, and a second interval, in which the upper arm or the lower arm is in a continuous state for one phase of the U phase, the V phase or the W phase, and, for the other two phases, the upper arms or the lower arms, which are not in continuous states for the one phase, are in continuous states, exist alternately.

A power conversion device according to an 11th aspect of the present invention comprises: an inverter circuit that includes a plurality of switching devices each operating as an upper arm or a lower arm, and that receives DC power and generates AC power for driving a motor; a control circuit that receives a torque command for driving the motor and generates a control signal for controlling the switching devices; a driver circuit that drives the switching devices based upon the control signal from the control circuit; and a smoothing capacitor module. In this power conversion device, it is preferred that: the inverter circuit comprises upper arm and lower arm series circuits that include the switching devices in correspondence to U phase, V phase and W phase respectively, each of which is connected to the smoothing capacitor module in parallel; the control circuit receives the torque command for the motor and generates the control signal for setting each of the switching devices to a continuous state in correspondence to an electrical angle of AC voltage for driving the motor; the driver circuit controls switching operations of the switching devices; and, by controlling the switching operations of the switching devices, current is supplied to a circuit between two phases of the U phase, the V phase and the W phase a plurality of times a half period of the AC voltage, in correspondence to a predetermined electrical angle of the AC voltage.

A power conversion device according to a 12th aspect of the present invention comprises: an inverter circuit that includes a plurality of switching devices each operating as an upper arm or a lower arm, and that receives DC power and generates AC power for driving a motor; a control circuit that receives a torque command for driving the motor and generates a control signal for controlling the switching devices; a driver circuit that drives the switching devices based upon the control signal from the control circuit; a smoothing capacitor module; a DC terminal that receives DC power; and an AC terminal for supplying motor AC power. In this power conversion device, it is preferred that: the inverter circuit comprises upper arm and lower arm series circuits that include the switching devices in correspondence to U phase, V phase and W phase respectively, each of which is connected to the smoothing capacitor module in parallel, each connection points of the upper arm and the lower arm of the series circuit being connected with the DC terminal; the control circuit generates the control signal for controlling continuous states for the switching devices of the inverter circuit based upon harmonic components to be eliminated of an AC wave form supplied from the AC terminal to the motor; and the switching operations of the switching devices in the inverter circuit are controlled based upon the control signal.

With the power conversion device according to the present invention, it is possible to reduce torque pulsation and switching losses.

BRIEF DESCRIPTION OF THE DRAWINGS

FIG. 5 is a figure for outline explanation of the flow of a procedure for harmonic component elimination pulse generation;

FIG. 11 is a flow chart showing a flow of processing for pulse pattern calculation;

FIG. 12 is a figure showing a method of pulse generation with a phase counter;

FIG. 14 is a figure showing a table for conversion between voltages between lines and phase terminal voltages.

DESCRIPTION OF THE PREFERRED EMBODIMENTS

Figure 1:
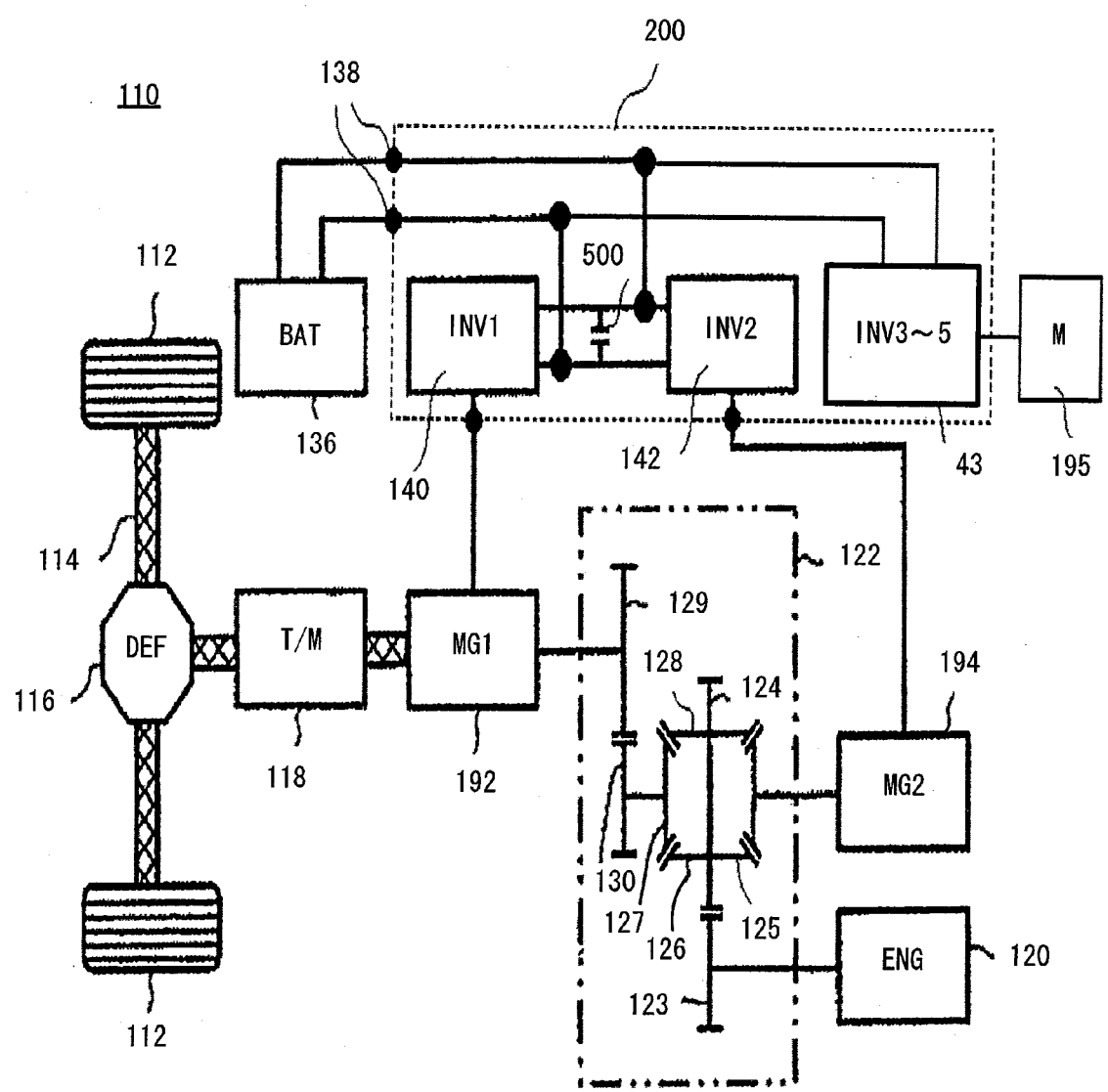
FIG. 1 is a diagram showing the control block structure of a hybrid electric vehicle.

The power conversion devices according to embodiments of the present invention will now be described with reference to the drawings. The power conversion device of the present invention can be applied to a hybrid electric vehicle, or to a pure electric vehicle. However, as a representative example, the control structure when a power conversion device according to an embodiment of the present invention is applied to a hybrid electric vehicle, and the circuit structure of that power conversion device, will be explained with reference to FIGS. 1 and 2. FIG. 1 is a diagram showing the control block structure of this hybrid electric vehicle.

This power conversion device according to an embodiment of the present invention will now be explained by describing an example in which it is used as an onboard power conversion device in an onboard electrical system that is mounted to an automobile, and in particular in an onboard electrical system for driving a vehicle, i.e. when it is used as a power conversion device for driving a vehicle, that is an application in which the mounting environment and the operational environment are extremely harsh. This power conversion device for driving the vehicle is fitted to the electrical system for driving the vehicle, and serves as a control device that controls the operation of an electric motor for driving the vehicle, and converts DC power that is supplied from an onboard battery constituting an onboard vehicle power supply, or DC power that is supplied from an onboard power generation device, into AC power of a specified type, thus controlling the electric motor for driving the vehicle by supplying the resulting AC power to the electric motor for driving the vehicle. Furthermore, since an electric motor for driving a vehicle also can provide a function of acting as a generator, therefore, according to the mode in which this power conversion device for driving a vehicle is operated, it may also have a function of converting AC power that is generated by the electric motor for driving the vehicle into DC power. The DC power that is thus produced by conversion may be supplied to the onboard battery.

It should be understood that, while the structure of this embodiment is optimized as a power conversion device for driving a vehicle such as an automobile or a truck or the like, it may also be applied to power conversion devices of other types. For example, this embodiment of the present invention could also be applied to a power conversion device for a train or a ship or an aircraft or the like, to a power conversion device for use in industry as a control device for an electric motor that drives a machine in a workplace, or to a power conversion device for household use that is employed as a control device for an electric motor that drives a home solar electricity generating system or an item of electrified household equipment or the like.

In FIG. 1, a hybrid electric vehicle (hereinafter termed a "HEV") 110 is a single electrically operated vehicle that is equipped with two vehicle drive systems. One of these is an engine system that utilizes an engine 120 as its power source. The engine system is used as the principal drive source for driving the HEV 110. The other drive system is an onboard electrical system that utilizes two motor-generators 192 and 194 as power sources. This onboard electrical system is principally used as a drive power source for the HEV 110 and as an electrical power generating source for the HEV 110. The motor-generators 192 and 194 may be, for example, synchronous machines or induction machines, and since, in terms of their method of operation, they function both as motors and as generators, in this specification they will be termed "motor-generators".

Two front wheel shafts 114 are rotatably supported at the front portion of the body of the vehicle. And a pair of front wheels 112 are provided at the ends of these front wheel shafts 114. Rear wheel shafts (not shown in the drawing) are rotatably supported at the rear portion of the vehicle body. And a pair of rear wheels (also not shown) are provided at the ends of these rear wheel shafts. While, with the HEV 110 of this embodiment, the so-called front wheel drive configuration is employed in which the main wheels that are powered by drive force are the front wheels 112, and the auxiliary wheels that free-wheel are the rear wheels (not shown), the present invention could also be applied to the reverse configuration, i.e. to a HEV that employs the rear wheel drive configuration.

A front wheel side differential gear system 116 (hereinafter termed the "front wheel DEF") is provided at the central portion between the two front wheel shafts 114. The front wheel shafts 114 are mechanically connected to output sides of this front wheel DEF 116. Furthermore, the output shaft of a speed change mechanism 118 is mechanically connected to an input side of the front wheel DEF 116. The front wheel DEF 116 is a differential type drive force distribution mechanism that distributes the rotational drive force transmitted and speed-changed by the speed change mechanism 118 between the left and right front wheel shafts 114. The output side of the motor-generator 192 is mechanically connected to the input side of the speed change mechanism 118. Furthermore, the output side of the engine 120 and the output side of the motor-generator 194 are mechanically connected to the input side of the motor-generator 192 via a drive force distribution mechanism 122. It should be understood that the motor-generators 192 and 194 and the drive force distribution mechanism 122 are housed in the interior of the casing of the speed change mechanism 118.

The motor-generators 192 and 194 are synchronous machines whose rotors incorporate permanent magnets. Drive controls of the motor-generators 192 and 194 are each performed by AC power that is supplied to their fixed armature windings being controlled by power conversion devices 140 and 142. A battery (BAT) 136 is electrically connected to the power conversion devices 140 and 142, and accordingly transfer of power can be performed between the battery 136 and the power conversion devices 140 and 142.

The HEV 110 of this embodiment includes two grouped electric drive/generator units, i.e. a first electric drive/generator unit that includes the motor-generator 192 and the power conversion device 140, and a second electric drive/generator unit that includes the motor-generator 194 and the power conversion device 142; and usage is divided between these according to the current operational state. In other words, when the vehicle is being driven by the drive force from the engine 120, if the drive torque of the vehicle is to be assisted, the second electric drive/generator unit is operated as an electricity generation unit by the drive force from the engine 120, while the first electric drive/generator unit is operated as an electric drive unit using the power that is generated in this way. Moreover, in a similar way, if the speed of the vehicle is to be assisted, the first electric drive/generator unit is operated as an electricity generation unit by the rotational force from the engine 120, while the second electric drive/generator unit is operated as an electrical drive unit using the power that is generated in this way.

Furthermore, with this first embodiment, it is possible to operate the first electric drive/generator unit as an electrical drive unit using the power of the battery 136, so as to drive the vehicle only with the drive force of the motor-generator 192. Yet further, with this first embodiment, it is possible to operate either the first electric drive/generator unit or the second electric drive/generator unit as an electricity generation unit with power from the engine 120, or with power from the vehicle wheels, so as to charge up the battery 136.

The battery 136 is also used as a power supply for driving an auxiliary machinery motor 195. In such auxiliary machinery there may be incorporated, for example, a motor that drives a compressor for an air conditioner, or a motor that drives a hydraulic pump for control. DC power is supplied from the battery 136 to the power conversion device 43, and is converted into AC power by the power conversion device 43 and supplied to the motor 195. This auxiliary machinery power conversion device 43 is endowed with a function similar to that of the power conversion devices 140 and 142 for driving the vehicle, and controls the phase, the frequency, and the power of the AC that it supplies to the motor 195. For example, the motor 195 generates torque due to AC power being supplied having a phase that leads with respect to the rotation of the rotor of the motor 195. Conversely, by AC power having a delayed phase being generated, the motor 195 operates as a generator, so that the motor 195 performs regenerative braking operation. The control function of this type for the power conversion device 43 is the same as the control functions for the power conversion devices 140 and 142. While the maximum conversion power of the power conversion device 43 is smaller than those of the power conversion devices 140 and 142 since the capacity of the motor 195 is smaller than the capacities of the motor-generators 192 and 194, the circuit structure of the power conversion device 43 is fundamentally the same as the circuit structures of the power conversion devices 140 and 142.

Furthermore, a capacitor module 500 is in close electrical relationship with the power conversion devices 140, 142 and 43. Moreover, these devices all have the common feature of needing countermeasures against generation of heat. Yet further, it is desirable to make the volumes of the power conversion devices as small as possible. From these points of view, in the power conversion device that is described in detail hereinafter, the power conversion devices 140 and 142, the power conversion device 43, and the capacitor module 500 are housed within the chassis of the power conversion device. With this type of structure, it is possible to implement a system that is compact and whose reliability is high.

Yet further, by housing the power conversion devices 140 and 142, the power conversion device 43, and the capacitor module 500 within a single chassis, the beneficial effect is obtained that it is possible to simplify the wiring and to implement countermeasures against noise. Yet further, it is possible to reduce the inductances in the circuitry that connects the capacitor module 500, the power conversion devices 140 and 142, and the power conversion device 43, and due to this not only is it possible to prevent the generation of spike voltages, but also it is possible to anticipate reduction of heat generation and enhancement of heat dissipation efficiency.

Next, the circuit structure of the power conversion devices 140 and 142 and the power conversion device 43 will be explained using FIG. 2. It should be understood that, in the embodiment shown in FIGS. 1 and 2, an example is presented in which each of the power conversion devices 140, 142, and 43 has its own individual structure. However, since each of the power conversion devices 140, 142, and 43 has similar circuit structure and operates in a similar manner and has similar functions, here the power conversion device 140 will be explained as a representative example.

The power conversion device 200 according to this embodiment includes the power conversion device 140 and the capacitor module 500. The power conversion device 140 includes a power conversion device circuit 144 and a control unit 170. The power conversion device circuit 144 includes a plurality of upper arm series circuits 150 and a plurality of lower arm series circuits 150 (in the example shown in FIG. 2, three upper arm series circuits 150 and three lower arm series circuits 150 are included). Each of these upper arm series circuits 150 includes an IGBT (Insulated Gate Bipolar Transistor) 328 and a diode 156 and operates as an upper arm, and each of these lower arm series circuits 150 includes an IGBT 330 and a diode 166 and operates as a lower arm. An intermediate point (i.e. an intermediate electrode) 169 of each of the upper and lower arm series circuits 150 is connected via an AC terminal 159 to an AC power line (i.e. an AC bus bar) 186, thus being connected via the AC power line 186 to the motor-generator 192. The control unit 170 includes a driver circuit 174 that controls the operation of the power conversion device circuit 144, and a control circuit 172 that supplies a control signal to the driver circuit 174 via a signal line 176.

The IGBTs 328 and 330 in the upper and lower arms are switching power semiconductor devices, and are operated by drive signals from the control unit 170 so as to convert DC power supplied from the battery 136 into three phase AC power. This power that has been converted is supplied to the armature windings of the motor-generator 192. As described above, the power conversion device 140 is capable of converting the three phase AC power generated by the motor-generator 192 into DC power.

The power conversion device 200 according to this embodiment incorporates, as shown in FIG. 1, not only the power conversion devices 140 and 142, but also the power conversion device 43 and the capacitor module 500. Since, as described above, the power conversion devices 140 and 142 and also the power conversion device 43 have similar structures, in FIG. 2 the power conversion device 140 will be described as a representative, and description of the power conversion device 142 and the power conversion device 43 will be omitted since it will already have been described.

The power conversion device circuit 144 is built as a three phase bridge circuit. In other words, the upper and lower arm series circuits 150 for each of the three phases are electrically connected in parallel between a DC positive terminal 314 and a DC negative terminal 316. This DC positive terminal 314 and DC negative terminal 316 are respectively connected to the positive electrode side and the negative electrode side of the battery 136. Here, the upper and lower arm series circuits 150 will be termed "arms", and they will be considered as including the upper arm side switching power semiconductor devices 328 and diodes 156, and the lower arm side switching power semiconductor devices 330 and diodes 156.

In this embodiment, an example will be described in which the IGBTs 328 and 330 are used as the switching power semiconductor devices. The IGBTs 328 and 330 have respective collector electrodes 153 and 163, emitter electrodes (respective signal emitter electrode terminals) 155 and 165, and gate electrodes (respective gate electrode terminals) 154 and 164. Diodes 156 and 166 are respectively electrically connected between the collector electrodes 153 and 163 of the IGBTs 328 and 330 and their emitter electrodes, as shown in the figure. Each of the diodes 156 and 166 has two electrodes, a cathode electrode and an anode electrode. The cathode electrodes are electrically connected to the collector electrodes of the IGBTs 328 and 330 while the anode electrodes are electrically connected to the emitter electrodes of the IGBTs 328 and 330, so that the forward directions of the diodes 156 and 166 are in the directions from the emitter electrodes of the IGBTs 328 and 330 towards their collector electrodes. It would also be acceptable to use MOSFETs (Metal Oxide Semiconductor Field Effect Transistors) as these switching power semiconductor devices. In such a case, the diodes 156 and 166 would not be required.

The upper and lower arm series circuits 150 are provided for each of three phases, corresponding to each of the three phase armature windings of the motor-generator 192. Each of the three upper arm and the three lower arm series circuits 150 is connected to the U phase, the V phase, or the W phase of the motor generator 192 via an AC terminal 159 and an intermediate electrode 169, to which the emitter electrode of one of the IGBTs 328 or the collector electrode 163 of one of the IGBTs 330 is connected. In each pair, the upper and lower arm series circuits 150 are connected in parallel. The collector electrodes 153 of the upper arm IGBTs 328 are each electrically connected (i.e. are connected via DC bus bars) to the positive pole side capacitor electrode of the capacitor module 500 via the positive terminals 157 (i.e. the P terminals), while the emitter electrodes of the lower arm IGBTs 330 are each electrically connected (via DC bus bars) to the negative pole side capacitor electrode of the capacitor module 500 via the negative terminals 158 (i.e. the N terminals). The intermediate electrodes 169 at the connection portions between the arms (i.e. at the connection portions between the emitter electrodes of the upper arm IGBTs 328 and the collector electrodes of the lower arm IGBTs 330) are electrically connected to the armature windings of the motor-generator 192 of the corresponding phases via an AC connector 188.

The capacitor module 500 acts as a smoothing circuit for suppressing fluctuations of the DC voltage generated by the switching operation of the IGBTs 328 and 330. Via DC connectors 138, the positive pole side of the battery 136 is connected to the positive pole side capacitor electrode of the capacitor module 500, while the negative pole side of the battery 136 is connected to the negative pole side capacitor electrode of the capacitor module 500. Due to this, the capacitor module 500 is connected between the collector electrodes 153 of the upper arm IGBTs 328 and the positive electrode side of the battery 136, and between the emitter electrodes of the lower arm IGBTs 330 and the negative pole side of the battery 136. In other words, it is electrically connected to the battery 136 and to the upper and lower arm series circuits 150 in parallel.

The control unit 170 is a circuit for operating the IGBTs 328 and 330. This control unit 170 includes a control circuit 172 that generates timing signals for controlling the timings at which the IGBTs 328 and 330 are switched on the basis of information that is input from other control devices or sensors or the like, and a drive circuit 174 that generates a drive signal for causing this switching operation of the IGBTs 328 and 330 on the basis of these timing signals output from the control circuit 172.

The control circuit 172 includes a microcomputer (not shown in the figures) that performs processing for calculating the switching timings for the IGBTs 328 and 330. As input information, a target torque value that is requested for the motor-generator 192, values of the currents being supplied to the armature windings of the motor-generator 192 from the upper and lower arm series circuits 150, and the position of the magnetic poles of the rotor of the motor-generator 192, are input to this microcomputer. The target torque value is a value based upon a command signal output from a higher level control device not shown in the figures. And the current values are values that are determined on the basis of a detection signal output from a current sensor 180. Moreover, the magnetic pole position is a value that is determined on the basis of a detection signal output from a magnetic pole rotation sensor not shown in the figures that is provided to the motor-generator 192. While in this embodiment an example is described in which the AC current value for each of the three phases is detected, it would also be acceptable to arrange to detect AC current values for only two of the phases.

The microcomputer incorporated in the control circuit 172 calculates current command values for the d and q axes of the motor-generator 192 on the basis of the target torque value, and then calculates voltage command values for the d and q axes on the basis of the differences between the current command values for the d and q axes that are the result of the above calculation and the current values for the d and q axes that have been detected. Then the microcomputer generates modulated pulse form waves from these voltage command values for the d and q axes. Naturally, the format of these pulse form modulated waves is generally a PWM signal. A PWM signal is a signal in pulse form that is generated on the basis of comparing together a fundamental wave (a sine wave) based upon the voltage command values for the U phase, the V phase, and the W phase and a carrier wave (a triangular wave). These voltage command values for the U phase, the V phase, and the W phase are obtained by converting the voltage command values for the d and q axes on the basis of the magnetic pole position that has been detected. These pulse form modulated signals that have been generated are output to the driver circuit 174.

When driving a lower arm, the driver circuit 174 amplifies the modulated pulse signal and outputs it as a drive signal to the gate electrode of the IGBT 330 of the corresponding lower arm. Furthermore, when driving an upper arm, it amplifies the modulated pulse signal after having shifted the level of the reference potential of this modulated pulse signal to the level of the reference potential of the upper arm, and outputs it as a drive signal to the gate electrode of the IGBT 328 of the corresponding upper arm. Due to this, each of the IGBTs 328 and 330 performs switching operation on the basis of the drive signal that is input to it. By the switching operation of the IGBTs 328 and 330 that is performed in this manner according to the drive signals from the control unit 170, the power conversion device 140 converts the voltage that is supplied from the battery 136, that constitutes a DC power supply, into output voltages for the U phase, the V phase, and the W phase spaced apart by 2π/3 radians of electrical angle, and supplies these output voltages to the motor-generator 192, that is a three phase AC motor. It should be understood that the electrical angle is a quantity that corresponds to the rotational state of the motor generator 192, i.e. in concrete terms to the rotational position of its rotor, and is a cyclic quantity that varies between 0 and 2π. By using this electrical angle as a parameter, it is possible to determine the switching states of the IGBTs 328 and 330, in other words the output voltages for the U phase, the V phase, and the W phase, according to the rotational state of the motor-generator 192.

Moreover, the control unit 170 performs detection of anomalies such as excess current, excess voltage, excess temperature and so on, and thereby protects the upper and lower arm series circuits 150. For this purpose, sensing information is input to the control unit 170. For example, information about the current that flows to the emitter electrode of each of the IGBTs 328 and 330 is input from the signal emission electrode terminals 155 and 165 of each arm to the corresponding drive unit (IC). Based upon this, each of the drive units (ICs) performs excess current detection, and, if it has detected excess current, stops the switching operation of the corresponding IGBT 328 or 330, thus protecting the corresponding IGBT 328 or 330 from excessive current. Furthermore, information about the temperatures of the upper and lower arm series circuits 150 is input to the microcomputer from temperature sensors (not shown in the figures) that are provided to the upper and lower arm series circuits 150. Yet further, information about the voltages at the DC positive electrode sides of the upper and lower arm series circuits 150 is input to the microcomputer. The microcomputer performs excess temperature detection and excess voltage detection on the basis of this information, and, if it detects excess temperature or excess voltage, stops the switching operation of all of the IGBTs 328 and 330, thus protecting the upper and lower arm series circuits 150 (and also the semiconductor modules that include these circuits 150) from excess temperature and excess voltage.

Figure 2:
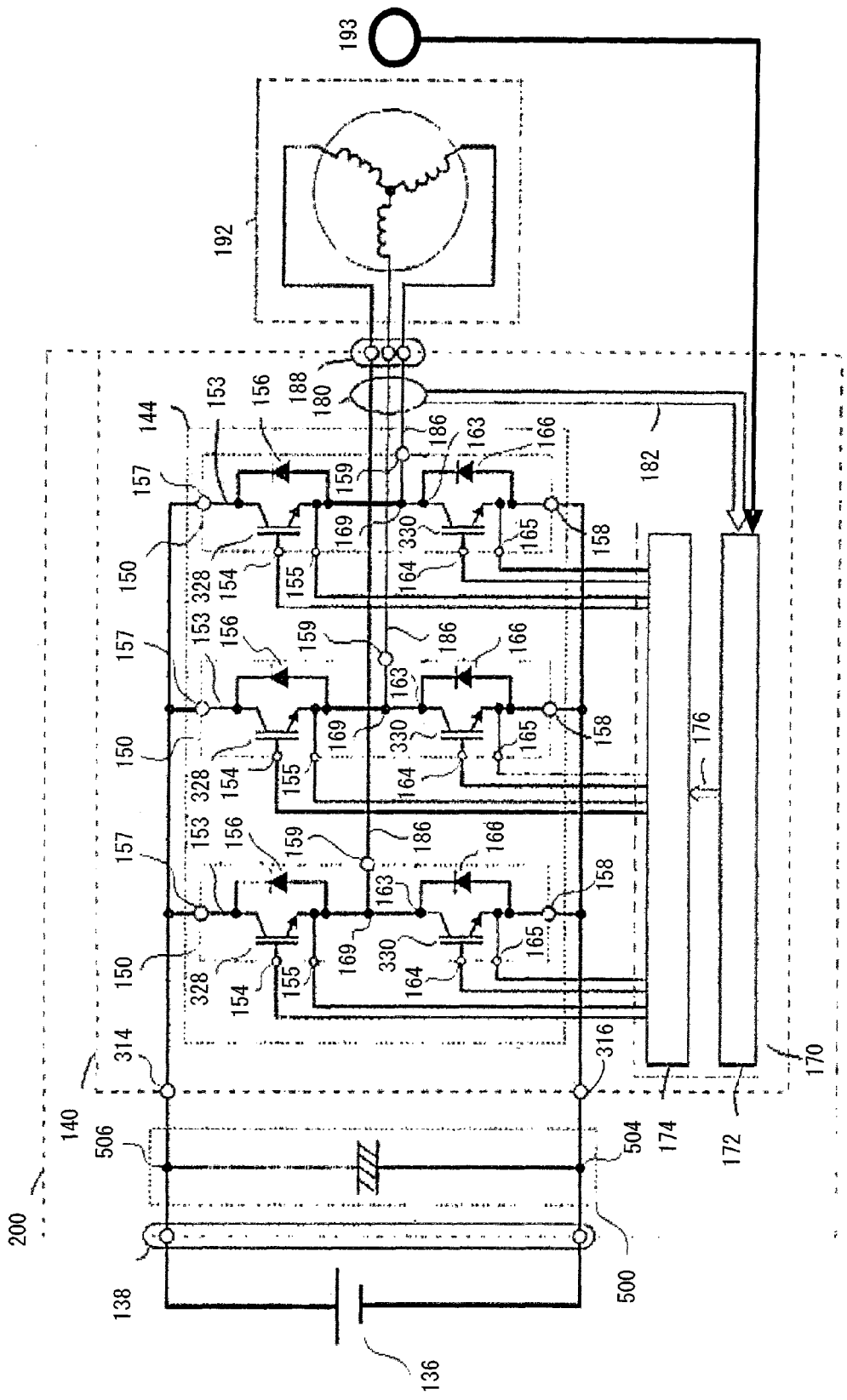
FIG. 2 is a diagram showing the structure of an electric circuitry of a power conversion device.

In FIG. 2, the upper and lower arm series circuits 150 are series circuits of the upper arm IGBTs 328 and the upper arm diodes 156, and series circuits of the lower arm IGBTs 330 and the lower arm diodes 166, and the IGBTs 328 and 330 are switching semiconductor devices. The operation of the IGBTs 328 and 330 of the upper and lower arms of the power conversion device circuit 144 to go continuous and discontinuous is changed over in a fixed order, and the current in the stator windings of the motor-generator 192 during this changeover flows in the circuits constituted by the diodes 156 and 166.

As shown in FIG. 2, the upper and lower arm series circuits 150 have: positive terminals (P terminals) 157, negative terminals (N terminals) 158, AC terminals 159 from the upper and lower arm intermediate electrodes 169, upper arm signal terminals (signal emitter electrode terminals) 155, upper arm gate electrode terminals 154, lower arm signal terminals (signal emitter electrode terminals) 165, and lower arm gate electrode terminals 164. Furthermore, the power conversion device 200 has the DC connector 138 at its input side and the AC connector 188 at its output side, and is connected to the battery 136 and the motor-generator 192 via these two connectors 138 and 188, respectively. It should be understood that it would also be acceptable to provide power conversion devices having a circuit structure in which, for each phase, two upper and lower arm series circuits are connected in parallel, as circuits that generate the output for each phase of the three phase AC to be output to the motor-generator.

Figure 3:
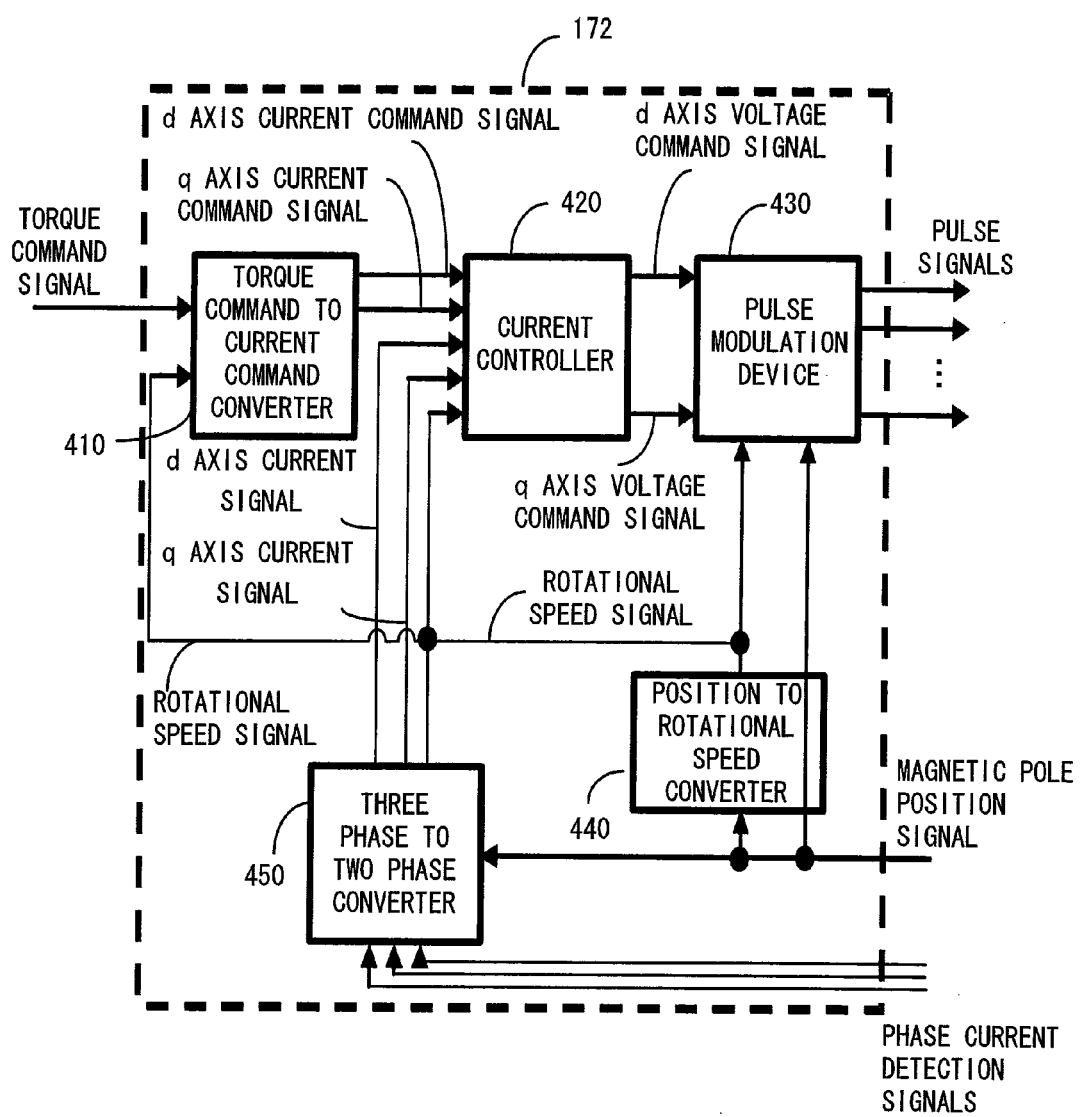
FIG. 3 is a block diagram showing the structure of a control unit.

Next, the motor control system within the control device 172 will be described with reference to FIG. 3. Usually, a torque command is input to a motor control system (sometimes the speed control system is also included in this higher level), and a d axis current command signal and a q axis current command signal, which are current command values for the motor 192, are output by a torque command to current command converter 410. It is generally the case that this torque command to current command converter 410 is constituted as a table of numerical values, which has as its input torque signals and rotational speed signals, and has as its output d axis current command signals and q axis current command signals.

The rotational speed signal is obtained by a magnetic pole position signal output from a magnetic pole rotational position sensor 193 being converted into a rotational speed signal by a position to rotational speed converter 440. The position to rotational speed converter 440 is, a functional block that consists of a differentiator in principle.

A current controller (ACR) 420 calculates a d axis voltage command signal and a q axis voltage command signal for the motor 192, so as to cause the actual currents to the motor 192 to track the d axis current command signal and the q axis current command signal. The actual currents to the motor 192 are detected by the current sensor 180. These actual currents that are thus detected are input to a three phase to two phase converter 450 as phase current detection signals. Furthermore, the magnetic pole position that is detected by the magnetic pole rotational position sensor 193 is input to the three phase to two phase converter 450 as a magnetic pole position signal. The three phase to two phase converter 450 converts the phase current detection signals for the three phases into a d axis current signal and a q axis current signal on the basis of the magnetic pole position signal, and supplies these d and q axis current signals to the current controller (ACR) 420.

In the prior art, vector control has been applied for controlling an AC motor, and generally the current control system has been based upon d-q coordinates. However since, in the present application, the particular structure of the vector control system has no direct relationship with the specifics of the implementation of the present invention, accordingly the details thereof will not be described herein.

The d axis voltage command signal and the q axis voltage command signal that have been calculated by the current controller (ACR) 420 are converted into pulse signals by a pulse modulation device 430 on the basis of the rotational speed signal and the magnetic pole position signal. The pulse signals that result from this conversion are transmitted to the driver circuit 174 via signal lines 176.

This pulse modulation device 430 generally, after having converted the d axis voltage command signal and the q axis voltage command signal into a U phase voltage command signal, a V phase voltage command signal, and a W phase voltage command signal on the basis of the magnetic pole position signal, then converts these signals into pulse signals (not shown in the figures) by a so called PWM (Pulse Width Modulation) modulation method. These pulse signals are signals that determine the timings at which the IGBTs 328 and 330 of the upper and lower arms for the U phase, the V phase, and the W phase are switched.

The distinguishing feature of the present application is the aspect of its modulation method in which, even with PWM, the number of switching times is reduced, and the present invention is distinguished by the particular structure of the pulse modulation device 430.

First, before describing the structure of the pulse modulation device 430 that is the subject of the present application, its fundamental theory will be explained with reference to FIGS. 4A, 4B and 4C.

As contrasted with the PWM method, the modulation method for which the number of switching times is the lowest is the rectangular wave control method. As shown in FIG. 4A, this rectangular wave control method is advantageous due to the feature that, since the number of switching times is remarkably low as compared with PWM, accordingly the loss is low because the number of switching times is low. However, a lot of harmonic components (of the fifth order, the seventh order, the eleventh order, . . . ) are included in the pulse signal, and these harmonic components cause current distortion to occur.

Here, an example will be offered of a method by which the fifth order harmonic component is eliminated from the rectangular wave.

Figure 4A:
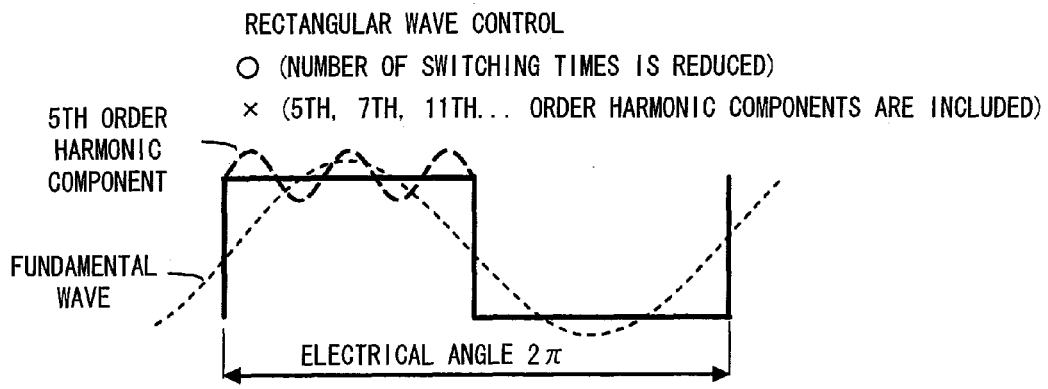
FIGS. 4A, 4B and 4C are figures for explanation of the theory of harmonic component elimination.
Figure 4B:
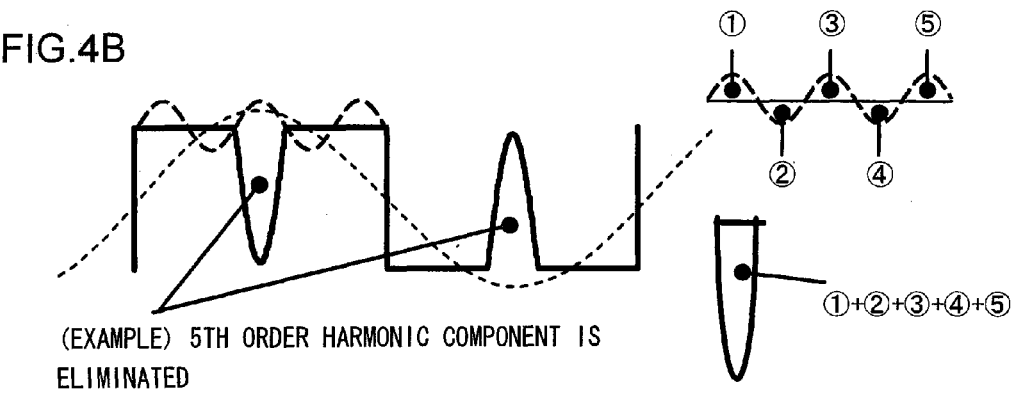

As in FIG. 4B, the fifth order harmonic component included in the basic rectangular wave is to be eliminated. At this time, from the standpoint of reducing the number of switching times, it is desirable to perform elimination at only one region in total. Thus, a portion included in the rectangular wave before deletion that has the same area as the fifth order harmonic component is deleted at a specified position, as shown in the figure.

Figure 4C:
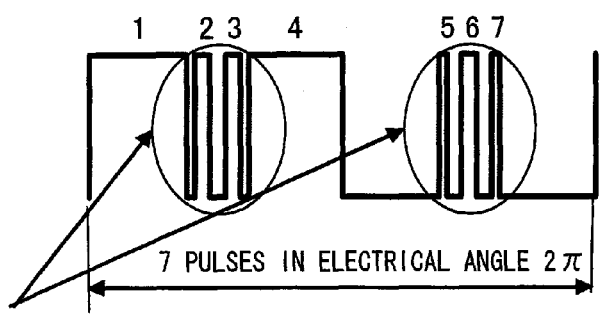

And FIG. 4C shows a case in which, while keeping down the number of switching times, square form pulses are generated so as to ensure the elimination of the fifth order harmonic component, as in FIG. 4B.

FIG. 5 is a figure showing the way in which the harmonic component elimination shown in FIGS. 4A, 4B and 4C is to be considered, in terms of a flow in which this elimination procedure is viewed from the point of view of Fourier series expansion. Here, the voltage waveform between two lines is termed $f(\omega t)$, and the flow for generation of pulses for the waveform between two lines is shown. A method is shown in which the pulse pattern is obtained by adding the conditions that $f(\omega t) = -f(\omega t + \pi)$ and $f(\omega t) = f(\pi - \omega t)$, in consideration of the symmetry of the pulse waveform. The pulse pattern is obtained by solving an equation in which $f(\omega)$ is expanded as a Fourier series, and the harmonic components of the orders to be eliminated are set to zero.

Figure 6:
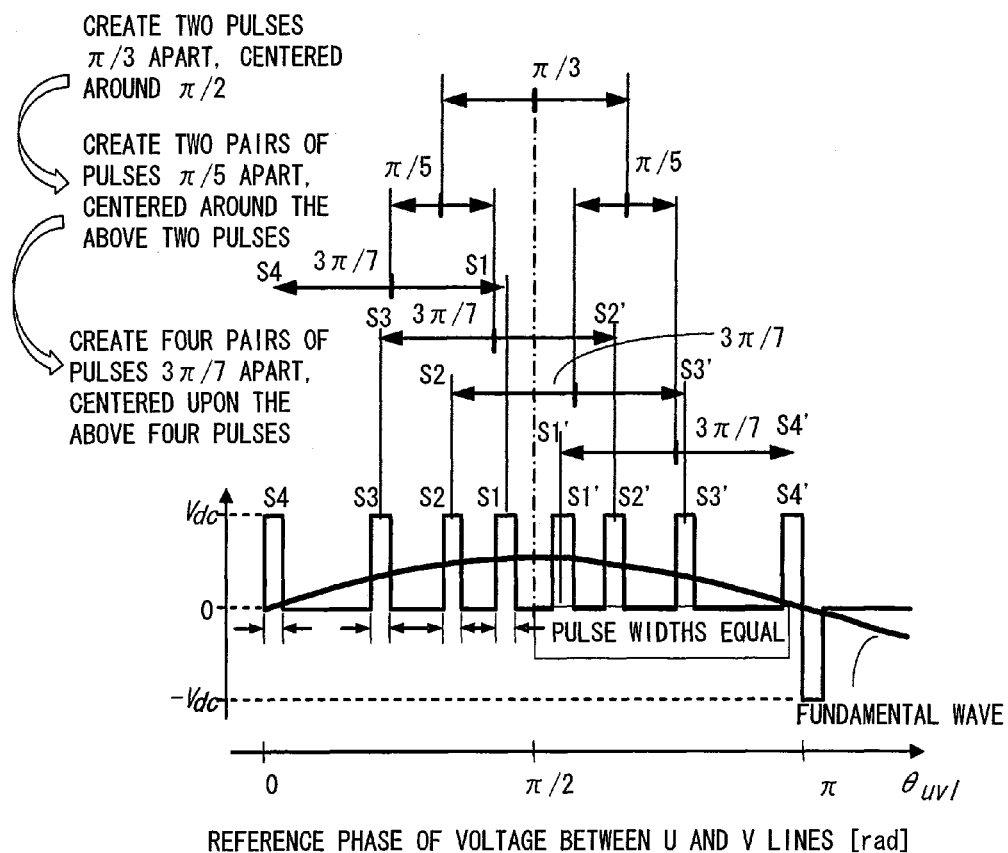
FIG. 6 is a figure showing the characteristics of a pattern of a voltage between lines.

FIG. 6 is a figure showing the process of generating a pattern for the voltage between the U and V lines in which the third order, fifth order, and seventh order harmonic components are eliminated, and also showing its characteristics. However, the voltages between lines are the electrical potential differences between the terminals for each phase. If the phase voltage of the U phase is termed Vu and the phase voltage of the V phase is termed Vv, then the voltage Vuv between the lines is given by Vuv=Vu−Vv. Since the voltages between the lines VW and WU are the same, in the following, the way in which the pattern for the voltage between the U and the V lines is generated will be explained as representative.

The fundamental wave of the voltage between the lines for the U phase and the V phase is shown as a reference along the horizontal axis in the figure. The term "the reference phase $\theta_{uvl}$ of the voltage between the U and V lines" is used for the phase shown on this axis. This reference phase $\theta_{uvl}$ of the voltage between the U and V lines corresponds to the electrical angle previously described. It should be understood that, since the section $\pi \leq \theta_{uvl} \leq 2\pi$ of the waveform of the voltage pulse train has a shape that is symmetrical to that of the section $0 \leq \theta_{uvl} \leq \pi$ shown here but with the reference symbols reversed, accordingly here it is omitted.

As shown in the figure, the fundamental wave of the voltage pulse is a sine wave voltage when referred to $\theta_{uvl}$. The pulses that are generated are centered around $\pi/2$ of this fundamental wave according to the steps shown in the figure, and are arranged at positions with respect to $\theta_{uvl}$ as shown in the figure by way of example. Here, since as described above $\theta_{uvl}$ corresponds to the electrical angle, it is possible to specify the positions in which the pulses in FIG. 6 are located by their electrical angles. Accordingly, in the following, the positions in which these pulses are located will be defined as specific electrical angle positions. In this way, a pulse train S1~S4 and S1'~S4' is created. This pulse train has a spectral distribution that includes the 3rd order, 5th order, and 7th order harmonic components of the fundamental wave. To put it in another manner, this pulse train is a waveform in which the 3rd order, 5th order, and 7th order harmonic components are eliminated from the rectangular wave whose region of definition is $0 \leq \theta_{uvl} \leq 2\pi$. It should be understood that the orders of the harmonic components that are eliminated can also be others than the 3rd, the 5th, and the 7th. When the fundamental wave frequency is low, harmonic components may be eliminated up to a high order, but when the fundamental wave frequency is high, it will be sufficient only to eliminate harmonic components up to a low order. For example, it is possible to change the number of orders that are eliminated according to the situation, by eliminating the 5th, 7th, and 11th orders when the rotational speed is low, changing to eliminating just the 5th order and the 7th order when the rotational speed rises, and eliminating only the 5th order when the rotational speed rises further. This is because, in the high rotational speed region, the winding impedance of the motor becomes great, so that the current pulsations become smaller.

In a similar manner, sometimes it is required to change the orders of the harmonic components that are to be eliminated according to the magnitude of the torque. For example, when the torque is to be increased under the condition that the rotational speed is to be kept fixed at some rotational speed value, then it is possible to change the number of orders that are eliminated according to the situation, by selecting the pattern in which the 5th, 7th, and 11th orders are eliminated when the torque is low, by eliminating just the 5th order and the 7th order when the torque increases, and by eliminating only the 5th order when the torque increases further.

Furthermore, the number of orders of harmonic components to be eliminated may not simply decrease together with an increase of torque and/or rotational speed, as described above; but, on the contrary, they may increase. Alternatively, in some cases the number of orders of harmonic components to be eliminated should not be changed, irrespective of whether the torque and/or the rotational speed increase or decrease. Since this must be determined in consideration of the values of indicators such as torque ripple of the motor, noise, EMC and so on, the present invention should not be considered as being limited to cases in which the number of orders of harmonic components to be eliminated changes monotonically with the rotational speed and/or the torque.

In the following, the way in which these pulse trains are generated will be described in concrete terms.

Figure 7:
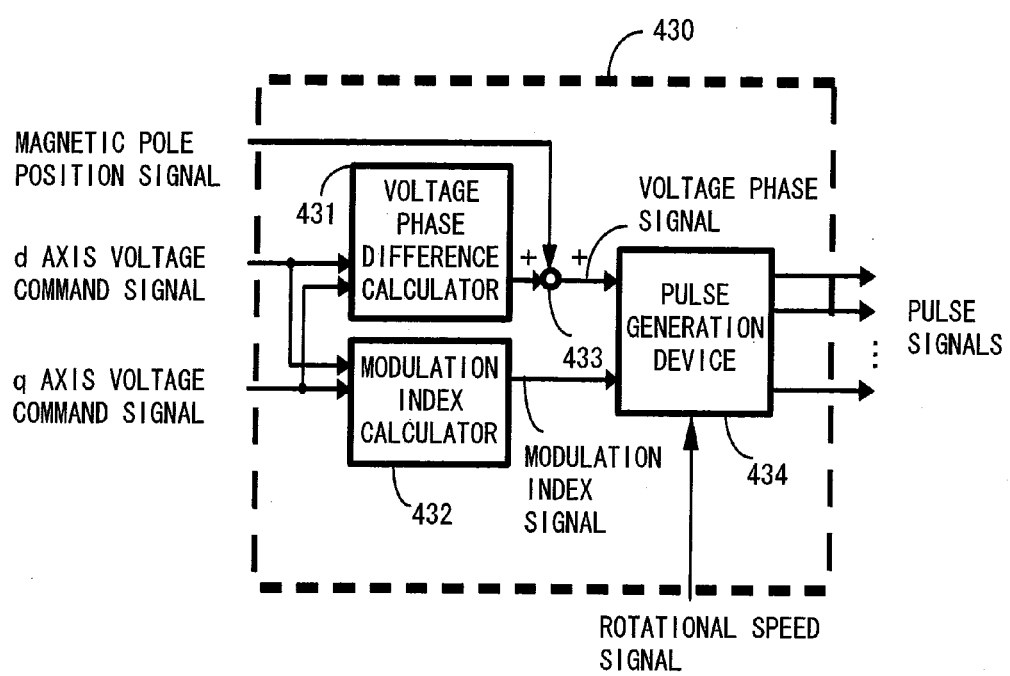
FIG. 7 is a block diagram showing the structure of a pulse modulation device.

FIG. 7 is a figure showing the details of the pulse modulation device 430, which is the core subject of the present application. The d axis voltage command signal and the q axis voltage command signal that are generated by the current controller 420 are input to a voltage phase difference calculator 431 and a modulation index calculator 432.

The phase difference between the magnetic pole position and the voltage phase, in other words the voltage phase difference, is calculated by the voltage phase difference calculator 432. If this voltage phase difference is termed δ, the d axis voltage command signal is termed Vd*, and the q axis voltage command signal is termed Vq*, then the voltage phase difference δ is given by the following Equation (1):

$$\delta = \arctan(-Vd^*/Vq^*) \tag{1}$$

Furthermore, the magnitude of the vector defined by the d axis voltage command signal and the q axis voltage command signal is normalized to the battery voltage by the modulation index calculator 432. In other words, if the modulation index is termed a and the battery voltage is termed Vdc, then the modulation index a is given by the following Equation (2):

$$a = (\sqrt{(Vd^{*2} + Vq^{*2})})/Vdc \tag{2}$$

The voltage phase difference signal calculated by the voltage phase difference calculator 431 is added to the magnetic pole position signal to yield the voltage phase signal. If this voltage phase signal is termed θv and the magnetic pole position signal is termed θe, then the voltage phase signal θv is given by the following Equation (3):

$$\theta v = \delta + \theta e + \pi \tag{3}$$

The voltage phase signal and the modulation index signal are input to the pulse generation device 434, and a pulse signal is output. This pulse signal is transmitted to the driver circuit 174 via the signal line 176.

Figure 8:
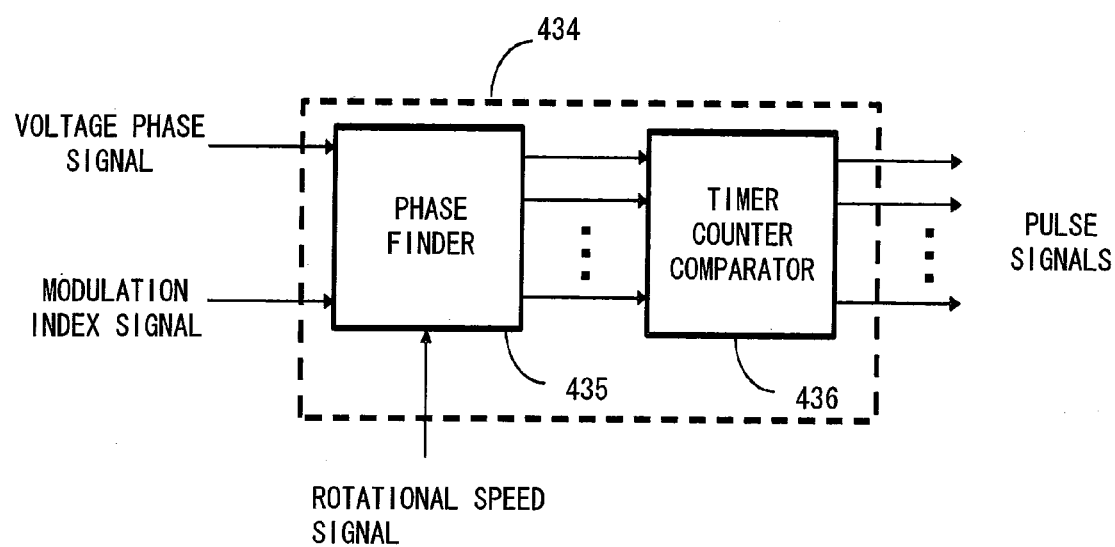
FIG. 8 is a block diagram showing the structure of a pulse generator.

The construction of the pulse generation device 434 is, for example, shown in FIG. 8. In FIG. 8, the voltage phase signal, the modulation index signal, and the rotational speed signal are input to a phase finder 435, and phase information for switching is output by searching a table in which phase information for switching pulses is stored. The phase information that is output is converted by a timer counter comparator into a pulse signal, which is a switching command, and this pulse signal is transmitted to the driver circuit 174 via the signal line 176.

Figure 9:
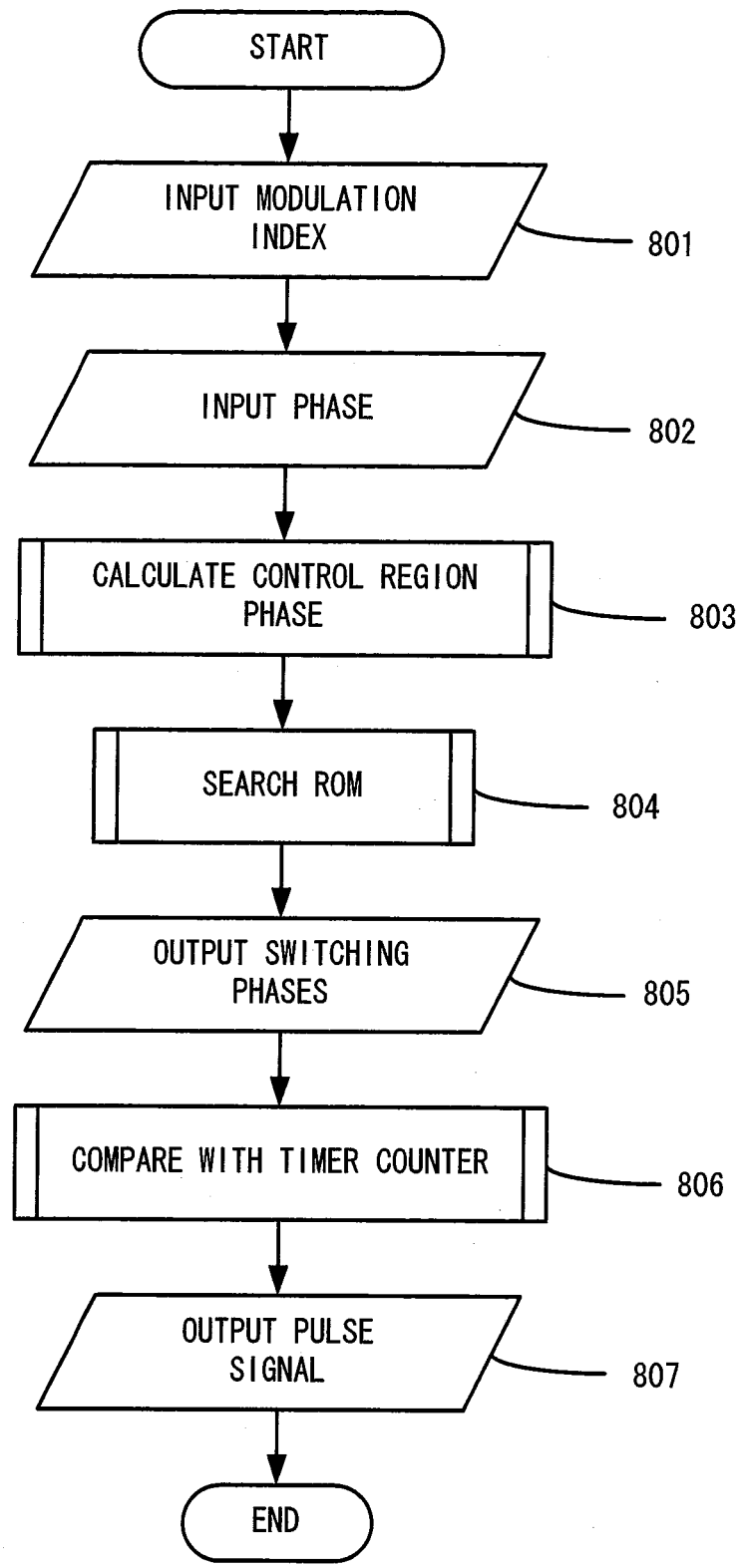
FIG. 9 is a flow chart showing the flow of processing performed by a table search method pulse generator.

The details of the table search method of FIG. 8 will now be explained with reference to the flow chart of FIG. 9. In a step 801 in FIG. 9 the modulation index signal is input, and in a step 802 the voltage phase signal is input. In a step 803, the range of voltage phase corresponding to the next control cycle is calculated in consideration of the present voltage phase signal that has been input and the control delay time and the rotational speed. Then in the ROM search of step 804 the phases at which switching ON and switching OFF are to be performed are found for the range of voltage phase calculated by the step 803.

After having output in a step 805 the phases at which switching ON and switching OFF are to be performed that have been obtained as a search result in the step 804, they are converted into time information in a step 806, and pulses are generated by using a function for comparing and matching the time information with a timer counter. At this time, the information in the rotational speed signal is utilized in the process of converting the phase information having output in the step 805 into time information.

The pulses generated in the step 806 is output in a step 807; and the above steps 801 through 807 are an example of the structure of the pulse generation device 434.

Another way for the pulse generation device 434 to operate is not a table search method in which the switching phases are stored in advance, but rather a method of generating them in real time. The flow chart for this is shown in FIG. 10 (no block diagram corresponding to FIG. 10 is given in the figures).

Figure 10:
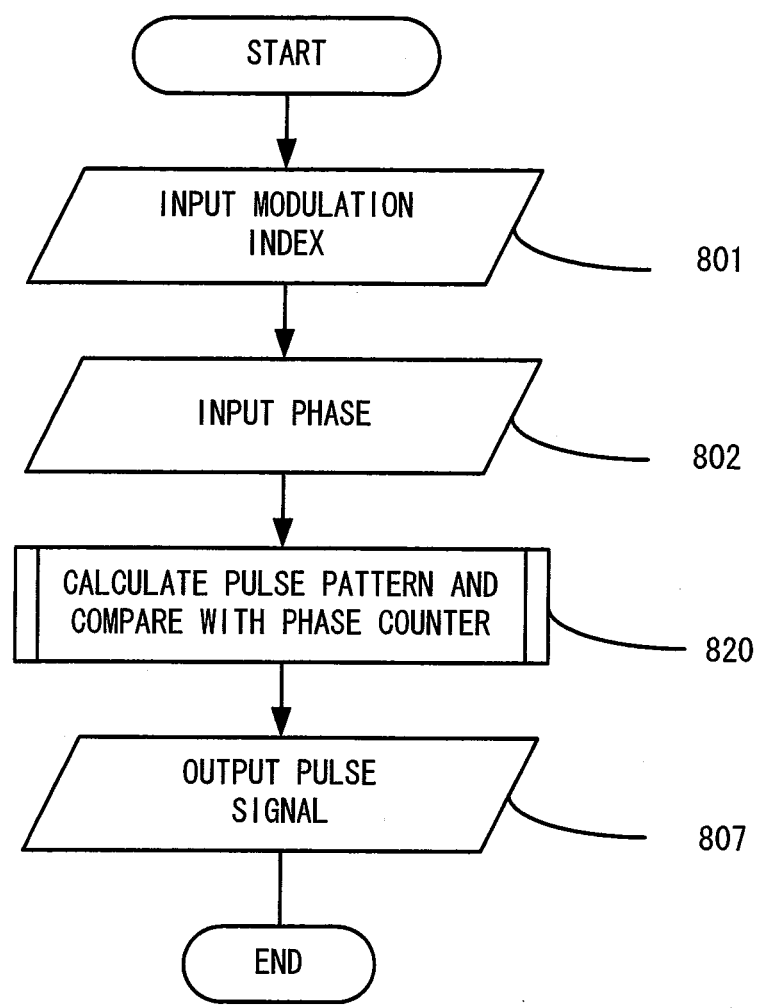
FIG. 10 is a flow chart showing the flow of processing performed by a real time calculation method pulse generator.

In the step 801 of FIG. 10, the modulation index signal is input, and in the step 802 the voltage phase signal is input. The phases for ON and OFF switching are determined in real time in consideration of the present voltage phase signal that has been input in a step 820 and the control delay period and the rotational speed.

The details of the step 820 are as shown in FIG. 11. In a first step 821, on the basis of the rotational speed and output information, the numbers of the orders of harmonic components to be eliminated are decided upon. A matrix calculation is performed in a step 822 according to the numbers of the orders of harmonic component that have been decided upon, and then in a step 823 the pulse reference angle is output.

In the pulse generation process from the step 821 through the step 823, the calculations shown in the following Equations (4) through (7) are performed.

Here, a case will be presented in which, as an example, the components of the 3rd order, the 5th order, and the 7th order are eliminated.

In the step 821, the numbers of the harmonic components to be eliminated are determined as the 3rd order, the 5th order, and the 7th order, then matrix calculation is performed in the step 822.

Thus, a row vector like that of Equation (4) is created for elimination of the 3rd order, the 5th order, and the 7th order harmonic components.

$$[x_1 x_2 x_3] = \pi/2 [k_1/3 k_2/5 k_3/7] \tag{4}$$

The elements within the right set of brackets in Equation (4) are $k_1/3$, $k_2/5$, and $k_3/7$. $k_1$, $k_2$, and $k_3$ are odd numbers; however, $k_1=3,9,15$, $k_2=5,15,25$, and $k_3=7,21,35$ and so on are never selected. If $k_1$, $k_2$, and $k_3$ satisfy this condition, it is possible to eliminate the 3rd order, 5th order, and 7th order harmonic components perfectly.

To describe the above procedure more generally, Equation (4) may be derived by taking the denominator of each element as the number of the order of the harmonic component to be eliminated, and the numerator of each element as any desired odd number except for odd multiples of its denominator. Accordingly, since there is some freedom in options for the numerators, it is also possible to shape the spectrum of elements that are not to be deleted with the value of the numerators.

Furthermore, since the values specified for the denominators and the numerators are not only elements that determine the harmonic components that should be eliminated, but also provide the beneficial effect of waveform shaping the spectrum of the elements that are not eliminated, accordingly it would also be acceptable to arrange to select the denominators at will, not primarily with the objective of elimination as described above, but with the primary objective of spectrum waveform shaping. In this case, there is no requirement for the values of the numerators and the denominators necessarily to be integers, but a numerator should not be selected to be an odd multiple of its denominator.

Furthermore, it is not necessary for the values of the numerators and the denominators to be fixed; they could also be values that change over time.

In addition, if there are three combinations of denominator and numerator as previously described, then these three form a three-column row vector as in Equation (4); but, if there are N combinations of denominator and numerator as previously described, then they will form a N-column row vector.

The vector [x1, x2, x3] obtained in this way and shown, as an example, in Equation (4) will be termed the "harmonic component reference phase vector". If this harmonic component reference phase vector is a three column vector as in Equation (4), then the calculation of Equation (5) is performed by transposing this harmonic component reference phase vector. As a result, the pulse reference angles S1 through S4 are obtained.

These pulse reference angles S1 through S4 are compared with a triangular wave carrier that will be described hereinafter, and are parameters that give the center positions of the voltage pulses. If there are four of the pulse reference angles S1 through S4, then generally the number of pulses in one cycle of the voltage between lines will be 16.

$$\begin{bmatrix} S_1 \\ S_2 \\ S_3 \\ S_4 \end{bmatrix} = \left\{ 2 \begin{bmatrix} 1 & 0 & 0 \\ 1 & 0 & 1 \\ 1 & 1 & 0 \\ 1 & 1 & 1 \end{bmatrix} - \begin{bmatrix} 1 & 1 & 1 \\ 1 & 1 & 1 \\ 1 & 1 & 1 \\ 1 & 1 & 1 \end{bmatrix} \right\} \begin{bmatrix} x_1 \\ x_2 \\ x_3 \end{bmatrix} \quad (5)$$

Furthermore, if the harmonic component reference phase vector is a four column vector as in Equation (6) instead of Equation (4), then the matrix calculation is performed according to Equation (7):

$$[x_1 \quad x_2 \quad x_3 \quad x_4] = \pi/2[k_1/3 \quad k_2/5 \quad k_3/7 \quad k_4/11] \quad (6)$$

$$\begin{bmatrix} S_1 \\ S_2 \\ S_3 \\ S_4 \\ S_5 \\ S_6 \\ S_7 \\ S_8 \end{bmatrix} = \left\{ 2 \begin{bmatrix} 1 & 0 & 0 & 0 \\ 1 & 0 & 0 & 1 \\ 1 & 0 & 1 & 0 \\ 1 & 0 & 1 & 1 \\ 1 & 1 & 0 & 0 \\ 1 & 1 & 0 & 1 \\ 1 & 1 & 1 & 0 \\ 1 & 1 & 1 & 1 \end{bmatrix} - \begin{bmatrix} 1 & 1 & 1 & 1 \\ 1 & 1 & 1 & 1 \\ 1 & 1 & 1 & 1 \\ 1 & 1 & 1 & 1 \\ 1 & 1 & 1 & 1 \\ 1 & 1 & 1 & 1 \\ 1 & 1 & 1 & 1 \\ 1 & 1 & 1 & 1 \end{bmatrix} \right\} \begin{bmatrix} x_1 \\ x_2 \\ x_3 \\ x_4 \end{bmatrix} \quad (7)$$

As a result, the pulse reference angle outputs S1 through S8 are obtained. At this time, the number of pulses per one cycle of the voltage between lines is 32 pulses.

To describe this in a more convenient manner, generally, if harmonic components of two orders are to be deleted from the voltage between lines, then the number of pulses per one cycle of the voltage between lines is 8 pulses; if the number of harmonic components to be deleted is three, then the number of pulses per one cycle of the voltage between lines is 16 pulses; if the number of harmonic components to be deleted is four, then the number of pulses per one cycle of the voltage between lines is 32 pulses; and if the number of harmonic components to be deleted is five, then the number of pulses per one cycle of the voltage between lines is 64 pulses.

However, in the case of a pulse configuration in which both positive pulses and negative pulses are superimposed upon the voltage between lines, then sometimes the number of pulses may be different from that specified above.

While three different arrangements of pulses in the voltages between lines are to be generated for the three different voltages, i.e. for the voltage between the U and the V lines, for the voltage between the V and the W lines, and for the voltage between the W and the U lines, since these voltages have the same pulse waveform and are only mutually shifted by phase differences of $2\pi/3$, accordingly here only the voltage between the U and the V lines will be explained as being representative.

Here, there is the relationship as Equation (8) between the reference phase $\theta_{uvl}$ of the voltage between the U and the V lines, the voltage phase signal $\theta v$, and the magnetic pole position signal $\theta e$:

$$\theta uvl = \theta v + \pi/6 = \theta e + \delta + 7\pi/6 [\text{rad}] \quad (8)$$

The voltage between the U and the V lines is bilaterally symmetric about $\theta_{uvl}=\pi/2$ and $3\pi/2$ as centers, and is point symmetric about $\theta_{uvl}=0$ and $\pi$ as centers. Accordingly, the array of one cycle of pulses of the voltage between lines (for $\theta_{uvl}$ from 0 to $2\pi$) can be expressed by arranging the pulse array of $\theta_{uvl}$ from 0 to $\pi/2$ symmetrically either horizontally or vertically for each $\pi/2$ radians.

One method for implementing this is an algorithm that generates pulses for the voltage between lines in $0 \leq \theta_{uvl} \leq 2\pi$ by comparing information about the center phases of the pulses in $0 \leq \theta_{uvl} \leq \pi/2$ of the voltage between the U and the V lines with a four channel phase counter. A conceptual figure for this procedure is shown in FIG. 12.

FIG. 12 is an example for a case in which there are four pulses in the voltage between lines in $0 \leq \theta_{uvl} \leq \pi/2$, and S1 through S4 denote the center phases of these four pulses.

On the other hand the phase counter has four channels, i.e. carr1($\theta_{uvl}$), ... carr4($\theta_{uvl}$), and the waveform is triangular and has a period of $2\pi$ radians with respect to $\theta_{uvl}$. Furthermore, carr1($\theta_{uvl}$) and carr2($\theta_{uvl}$) have a mutual deviation of d$\theta$ in the amplitude direction, and carr3($\theta_{uvl}$) and carr4($\theta_{uvl}$) are in the same relationship.

d$\theta$ is the width of the pulses in the voltage between lines, and the amplitude of the fundamental wave changes linearly with respect to d$\theta$.

For the pulses in the voltage between lines, a pattern that is symmetrical every 90° is generated at the points of intersection of the phase counters carr1($\theta_{uvl}$) ... carr4($\theta_{uvl}$) with S1 ... S4, which are the information about the center phases of the pulses in $0 \leq \theta_{uvl} \leq \pi/2$.

In more detail, pulses of positive amplitude and width d$\theta$ are generated at the points where carr1($\theta_{uvl}$) and carr2($\theta_{uvl}$) meet S1 ... S4, and pulses of negative amplitude and width d$\theta$ are generated at the points where carr3($\theta_{uvl}$) and carr4($\theta_{uvl}$) meet S1 ... S4.

Figure 13:
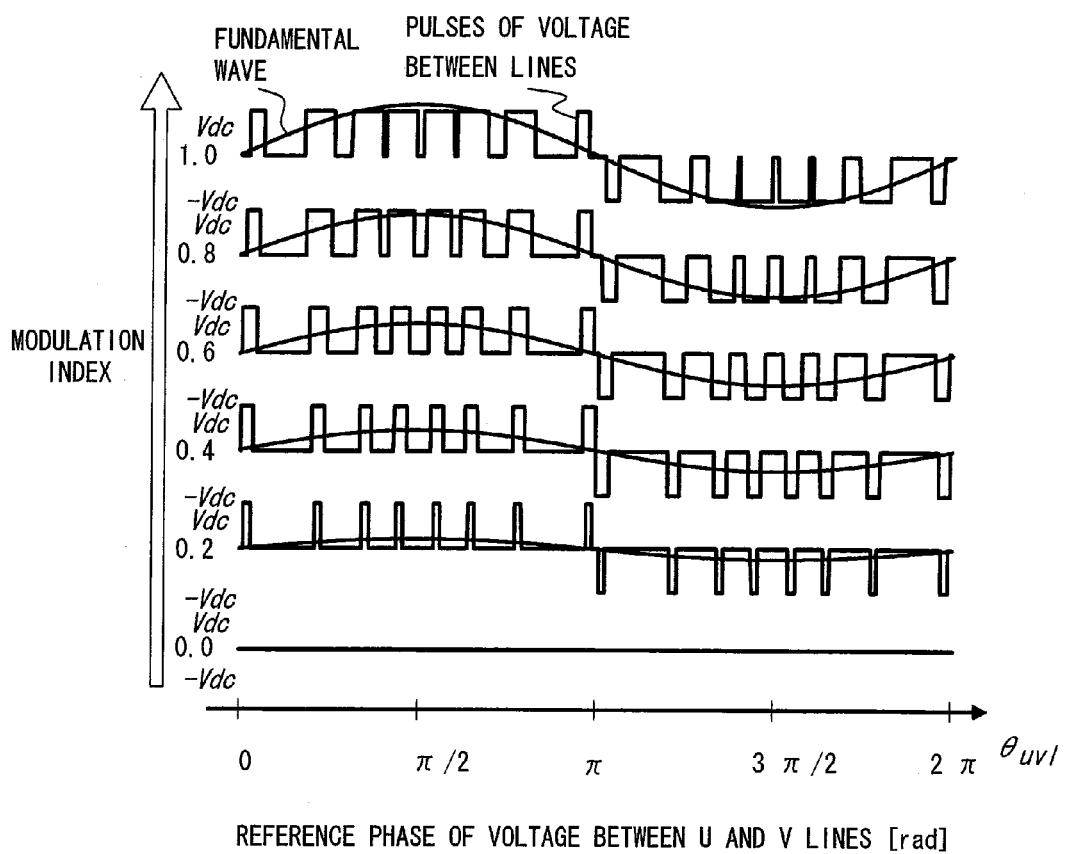
FIG. 13 is a chart of a voltage waveform between lines with respect to modulation index.

When the voltage between lines generated on the basis of the concept for generating the voltage between lines of FIG. 12 is plotted against the modulation index, then FIG. 13 is obtained. The figure shows the pulse waveform for the voltage between lines as the modulation index changes from 0 to 1.0. It will be understood that the pulse width increases almost in proportion to the modulation index. Due to this, the effective value of the voltage increases. However, at a modulation index of 0.4 or greater, the pulses in the vicinity of $\theta_{uvl}=0$, $\pi$, and $2\pi$ do not change in pulse width along with change of the modulation index. This type of phenomenon occurs because the pulses that have positive amplitude and the pulses that have negative amplitude are overlapping one another.

The pulse waveform of the voltage between lines produced by the method described in the present application is characterized in which, when the modulation index is fixed, the pulse widths of the pulse train are equal, apart from certain exceptions. The exceptional cases when the pulse width of the voltage between lines is unequal to the pulse widths of the rest of the pulses in the pulse train, are when the pulses that have positive amplitude and the pulses that have negative amplitude overlap one another. If the portions in which the pulses overlap are decomposed into pulses that have positive amplitude and pulses that have negative amplitude, the width of the pulses would definitely be equal over the entire area. In other words, the modulation index would change along with change of the pulse width.

In the above, the characteristics of the method for conversion to a voltage between lines and of the pulses of the voltage between lines have been explained. Finally, it is necessary to convert the information about the pulses of the voltage between lines into phase terminal voltage pulses (that are proportional to gate voltage pulses), that are employed for switching by the IGBTs.

A conversion table for performing this conversion is shown in FIG. 14. The mode in the leftmost column of the table is a number allocated to the switching state that currently is in force. The relationships from the voltages between lines to the output voltages are one-to-one with the modes #1 through #6. Each mode is an active interval in which energy transfer takes place between the DC side and the three phase AC side. This will now be explained by presenting FIG. 14 as an example. The voltages between lines of FIG. 14 have been adjusted by normalizing the patterns exhibited as potential differences between the different phases by the battery voltage Vdc. For example, while in mode #1 it is shown that Vuv→1, Vvw→0, and Vwu→−1, this is shown normalized as being the case of Vu−Vv=Vdc, Vv−Vw=0, and Vw−Vu=−Vdc. The phase terminal voltages at this time (that are proportional to the gate voltages) are shown as normalized when Vu→1 (the upper arm of the U phase is ON and the lower arm is OFF), Vv→0 (the upper arm of the V phase is OFF and the lower arm is ON), and Vw→0 (the upper arm of the W phase is OFF and the lower arm is ON), in other words when Vu=Vdc, Vv=0, and Vw=0. The modes #2 through #6 are established according to similar principles.

Figure 15:
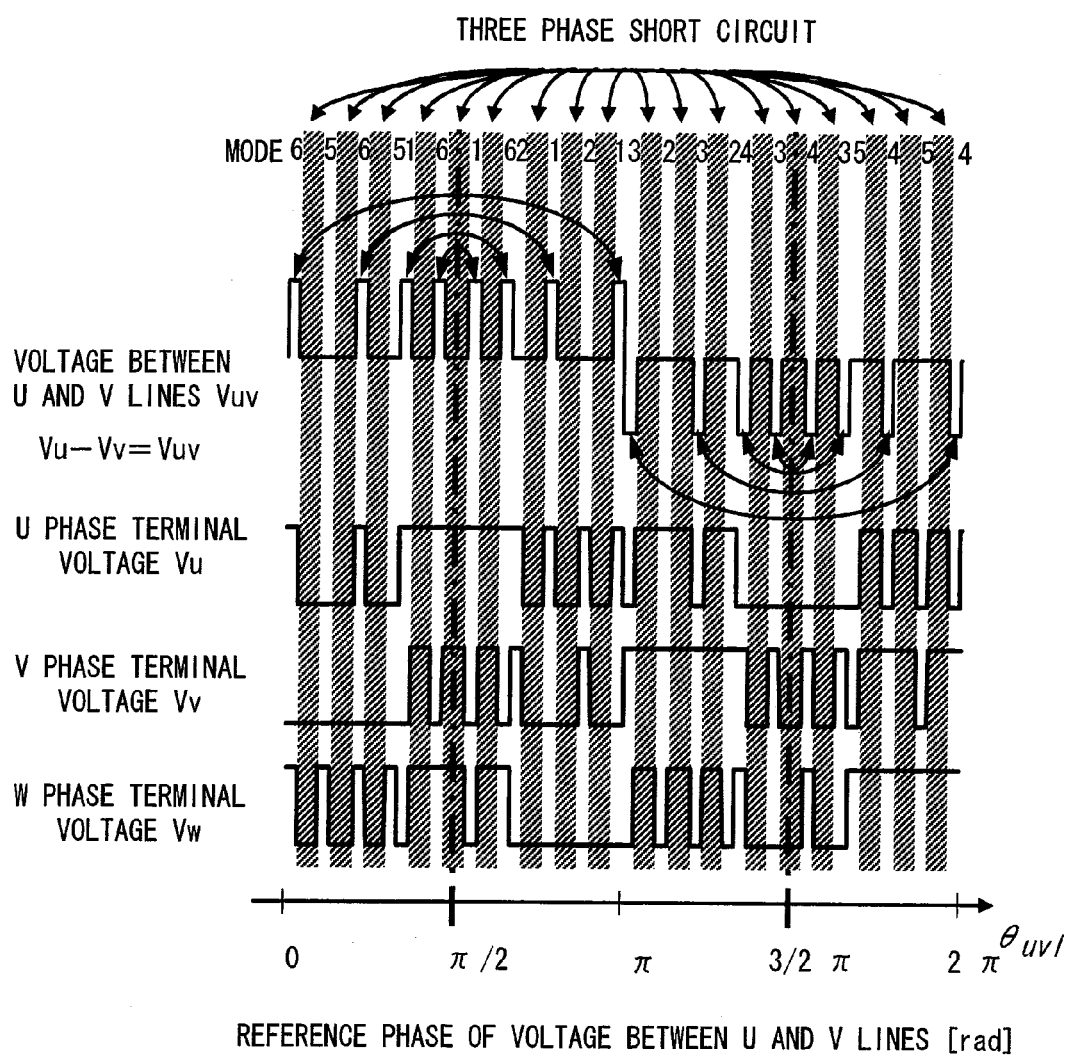
FIG. 15 is a figure showing an example of conversion between pulses of voltages between lines and voltage pulses at phase terminals.

FIG. 15 shows an example of conversion from pulses of the voltages between lines to pulses of the phase terminal voltages (i.e. gate voltage pulses) performed using the table of FIG. 14. The upper portion of this figure shows the pulses of the voltage between the U and the V lines as a representative example of the voltages between lines, while the lower portion shows the U phase terminal voltage Vu, the V phase terminal voltage Vv, and the W phase terminal voltage Vw.

The number of the mode (i.e. the active interval in which energy transfer takes place between the DC side and the three phase AC side) and the time interval over which a three phase short circuit is created are shown in the upper portion of the figure. In this three phase short circuit interval, while either all of the upper arms for all of the three phases are ON or all of the lower arms for all of the three phases are ON, any of the switch modes may be selected, according to the situation with switching loss and continuity loss.

For example, when the voltage Vuv between the U and V lines is 1, the U phase terminal voltage Vu is 1 and the V phase terminal voltage Vv is 0 (modes #1 and #6). And, when the voltage Vuv between the U and V lines is 0, the U phase terminal voltage Vu and the V phase terminal voltage Vv have the same value, in other words either Vu is 1 and moreover Vv is 1 (mode #2, three phase short circuit), or Vu is 0 and moreover Vv is 0 (mode #5, three phase short circuit). And, when the voltage Vuv between the U and V lines is −1, the U phase terminal voltage Vu is 0 and the V phase terminal voltage Vv is 1 (modes #3 and #4). The phase terminal voltage pulses (i.e. the gate voltage pulses) are generated on the basis of this type of relationship.

Furthermore, the pattern of the pulses of voltage between lines or of phase terminal voltage pulses is a pattern that repeats with respect to the phase $\theta_{uvi}$ at a standard period whose minimum unit is $\pi/3$. In particular, this characteristic is exhibited prominently in the stationary state as in FIG. 15, in which the rotational speed and the output are constant. In other words, the pattern of the U phase terminal voltage in the interval $0 \leq \theta_{uvi} \leq \pi/3$ with 1 and 0 interchanged is the pattern of the W phase terminal voltage in the interval $\pi/3 \leq \theta_{uvi} \leq 2\pi/3$, the pattern of the V phase terminal voltage in the interval $0 \leq \theta_{uvi} \leq \pi/3$ with 1 and 0 interchanged is the pattern of the U phase terminal voltage in the interval $\pi/3 \leq \theta_{uvi} \leq 2\pi/3$, and the pattern of the W phase terminal voltage in the interval $0 \leq \theta_{uvi} \leq \pi/3$ with 1 and 0 interchanged is the pattern of the V phase terminal voltage in the interval $\pi/3 \leq \theta_{uvi} \leq 2\pi/3$.

Here, the modes #1 through #6 described above are defined as a first interval in which the upper arm IGBTs 328 and the lower arm IGBTs 330 are turned ON at different phases and current is supplied to the motor-generator 192 from the battery 136 constituting a DC power supply. Furthermore, the three phase short circuit interval is defined as a second interval in which, for all phases, either the upper arm IGBTs 328 or the lower arm IGBTs 330 are turned ON, and the torque is maintained by energy accumulated in the motor-generator 192. It will be understood that, in the example shown in FIG. 15, this first interval and second interval are formed alternatingly according to the electrical angle.

Furthermore, in FIG. 15, in the interval $0 \leq \theta_{uvi} \leq \pi/3$ for example, the modes #6 and #5 are repeated alternatingly as the first interval, on both sides of three phase short circuit intervals as the second interval. As will be understood from FIG. 14, here, in the mode #6, while for the V phase the lower arm IGBT 330 is switched to ON, for the other phases, i.e. for the U phase and the W phase, the IGBTs on the side opposite to that of the V phase, in other words the upper arm IGBTs 328, are switched to ON. On the other hand, in the mode #5, while for the W phase the upper arm IGBT is switched to ON, for the other phases, i.e. for the U phase and the V phase, the IGBTs on the side opposite to that of the W phase, i.e. the lower arm IGBTs 330, are switched to ON. That is to say, in the first interval, some one phase of the U phase, the V phase, and the W phase is selected (in mode #6 the V phase, and in mode #5 the W phase), and, along with switching the upper arm IGBT 328 or the lower arm IGBT 330 for this selected one phase to ON, also, for the other two phases (in mode #6 the U phase and the W phase, and in mode #5 the U phase and the V phase), the IGBTs 328 or 330 for the arms on the side different from that of the one phase that is selected are switched to ON. Furthermore, the selected one phase (the V phase or the W phase) is changed over for each successive first interval.

And, in the intervals other than the interval $0 \leq \theta_{uvi} \leq \pi/3$ as well, in a similar manner to that described above, certain ones of the modes #1 through #6 are alternatingly repeated as the first interval, interleaved with the three phase short circuit interval being repeated as the second interval. In other words: in the interval $\pi/3 \leq \theta_{uvi} \leq 2\pi/3$, the modes #1 and #6 are repeated alternatingly; in the interval $2\pi/3 \leq \theta_{uvi} \leq \pi$, the modes #2 and #1 are repeated alternatingly; in the interval $\pi \leq \theta_{uvi} \leq 4\pi/3$, the modes #3 and #2 are repeated alternatingly; in the interval $4\pi/3 \leq \theta_{uvi} \leq 5\pi/3$, the modes #4 and #3 are repeated alternatingly; and in the interval $5\pi/3 \leq \theta_{uvi} \leq 2\pi$, the modes #5 and #4 are repeated alternatingly. Due to this, in a similar manner to that described above, in the first interval, any single one of the U phase, the V phase, and the W phase is selected, and, for the selected phase, the upper arm IGBT 328 or the lower arm IGBT 330 is switched to ON, and also, for the other two phases, the IGBTs 328 or 330 for the arms on the side that is different from the side of the single phase that is selected are switched to ON. Furthermore, the selection of the single phase is changed over for each successive first interval.

Now, according to a request command to the motor-generator 192 for torque or rotational speed or the like, it is possible to change the first interval described above, in other words the electrical angle position at which the interval of the modes #1 through #6 is formed, and the length of that interval. In other words, in order to change the number of orders of harmonic components to be eliminated along with change of the rotational speed or the torque of the motor as previously described, the specified electrical angle position at which the first interval is formed may be changed. Or, according to change of the rotational speed or the torque of the motor, the length of the first interval, in other words the pulse width, may be changed, so that as explained with reference to FIG. 13 the modulation index may be changed. Due to this, the waveform of the AC current flowing in the motor, in concrete terms the harmonic components of this AC current, are changed to the desired values, and, due to this change, it is possible to control the power that is supplied from the battery 136 to the motor-generator 192. It should be understood that it would be acceptable either to change only one of the specified electrical angle position and the length of the first interval, or alternatively to change both of them simultaneously.

Now, the following relationship holds between the shape of the pulses and the voltage. The width of the pulses shown in the figure has the effect of changing the effective value of the voltage, and when the pulse width of the voltage between lines is broad the effective value of the voltage is large, while when it is narrow the effective value of the voltage is small. Furthermore, since the effective value of the voltage is high when the number of harmonic components to be deleted is small, accordingly the waveform approaches a rectangular wave at the upper limit of the modulation index. This effect is beneficial when the electric motor (i.e. the motor-generator 192) is rotating at high speed so that it is possible to perform output for the motor while exceeding the upper limit of output that is obtained when control is being performed by normal PWM. In other words, by changing the length of the first interval during which power is supplied to the motor-generator 192 from the battery 136 that constitutes a DC power source and the specified electrical angle position at which this first interval is formed, it is possible to obtain output corresponding to the rotational state of the motor generator 192 by changing the effective value of the AC voltage that is applied to the motor-generator 192.

Furthermore, for each of the U phase, the V phase, and the W phase, the pulse shape of the drive signal shown in FIG. 15 is left and right asymmetric about any $\theta_{uvl}$, in other words about any electrical angle. Moreover, at least one of the pulse ON interval or the pulse OFF interval includes a continuous interval over $\pi/3$ or more of $\theta_{uvl}$ (electrical angle). For example, for the U phase, there is an ON interval of $\pi/6$ or more in length both before and after a center near $\theta_{uvl}=\pi/2$, and there is also an OFF interval of $\pi/6$ in length both before and after a center near $\theta_{uvl}=3\pi/2$. In a similar manner, for the V phase, there is an OFF interval of $\pi/6$ or more in length both before and after a center near $\theta_{uvl}=7\pi/6$, and there is also an ON interval of $\pi/6$ in length both before and after a center near $\theta_{uvl}=7\pi/6$; and, for the W phase, there is an OFF interval of $\pi/6$ or more in length both before and after a center near $\theta_{uvl}=5\pi/6$, and there is also an ON interval of $\pi/6$ in length both before and after a center near $\theta_{uvl}=11\pi/6$. The system has this type of characteristic pulse shape.

As has been explained above, according to the power conversion device of this embodiment, a first interval in which power is supplied from the DC power supply to the motor, and a second interval in which the upper arms for all the phases or the lower arms for all the phases of this three phase full bridge circuit are switched to ON, are generated alternately at a specified timing according to electrical angle. Due to this, it is possible to manage with a switching frequency that is from $1/7$ to $1/10$ as compared to the normal PWM control as performed in the prior art. Furthermore, it is possible to change the harmonic components of the AC current flowing in the motor to any desired values. In particular, it is possible to reduce the pulsations by shaping the motor current into an approximately sine wave like form. By doing this, it is possible to reduce the switching loss to around $1/10$ as compared to that in a power conversion device that performs normal PWM control, while still suppressing pulsation of the torque generated by the motor, and it is possible to supply a power conversion device in which also EMC is suppressed.

It should be understood that, if the frequency of switching is reduced, apart from reducing the switching loss, also it is possible to alleviate EMC (electromagnetic noise), that is a problem with an inverter. The so called two phase modulation method is per se known as a prior art method of reducing the frequency of switching. According to this two phase modulation method, it is possible to reduce the frequency of switching to around $2/3$, as compared to normal sine wave PWM. However, with this method, there is a shortcoming with regard to alleviation of EMC. By contrast, with this embodiment of the present invention, as described and explained above, it is possible to reduce the frequency of switching to around $1/10$ as compared to normal PWM control. If the frequency of switching is reduced to around $1/10$, then the equivalent frequency becomes $1/10$, and the spectrum of the harmonic components of the PWM pulse signal is attenuated by about 20 dB. In other words, speaking in terms of absolute value, it is reduced to about $1/100$. Accordingly it is possible to anticipate effective reduction of EMC.

The above explanation is only provided by way of example; the present invention is not to be considered as being limited in any way by the details of the disclosed embodiments.

What is claimed is:

1. A power conversion device, comprising:
    an inverter circuit that includes a plurality of switching devices each operating as an upper arm or a lower arm, and that receives DC power from a battery and generates AC power for driving a motor;
    a control circuit that receives a torque command for driving the motor and generates a control signal for controlling the switching devices; and
    a driver circuit that drives the switching devices based upon the control signal from the control circuit, wherein:
    the inverter circuit comprises upper arm and lower arm series circuits that include the switching devices in correspondence to U phase, V phase and W phase and that are connected to a U phase AC power line, a V phase AC power line and a W phase AC power line for supplying the AC power to the motor, respectively;
    the control circuit generates the control signal for setting each of the switching devices to a continuous state in correspondence to an electrical angle of AC voltage for driving the motor, based upon the received torque command for the motor;
    the driver circuit controls switching operations of the switching devices; and
    by controlling the switching operations of the switching devices, any one of the U phase AC power line, the V phase AC power line and the W phase AC power line is electrically connected to the positive electrode side of the battery and also either of the others of the U phase AC power line, the V phase AC power line and the W phase AC power line is electrically connected to the negative electrode side of the battery a plurality of times a half period of the AC voltage, in correspondence to the electrical angle of the AC voltage for driving the motor, and, by this connection, current is supplied from the battery to the motor that is connected as a load.

2. A power conversion device according to claim 1, wherein:
the control circuit receives rotational information for the motor and generates the control signal based upon the torque command and the rotational information for the motor that have been received.

3. A power conversion device according to claim 1, wherein:
the control circuit controls the switching devices so that a pattern of connection periods during which two of the U phase AC power line, the V phase AC power line and the W phase AC power line are connected to the battery is symmetric about the electrical angle of the AC voltage being 180° as a center.

4. A power conversion device according to claim 1, wherein:
the control circuit controls the switching devices so that connection periods in the half period of the AC voltage during which two of the U phase AC power line, the V phase AC power line and the W phase AC power line are connected to the battery are symmetric about the electrical angle of the AC voltage being 90° as a center.

5. A power conversion device according to claim 1, further comprising a current sensor that detects current supplied from the inverter circuit to the motor, wherein:
the control circuit generates the control signal based upon the torque command and a current value detected by the current sensor.

6. A power conversion device according to claim 1, wherein:
the control circuit includes a memory in which continuity information for the switching devices in correspondence to the electrical angle of the AC voltage is stored; and
the control circuit reads out the continuity information for the switching devices from the memory and generates the control signal based upon the continuity information that has been read out.

7. A power conversion device according to claim 1, wherein:
if the torque command is increased, the control circuit generates the control signal so that connection periods during which two of the U phase AC power line, the V phase AC power line and the W phase AC power line are connected to the battery are prolonged.

8. A power conversion device according to claim 1, further comprising a smoothing capacitor module that is connected to the battery, wherein:
the inverter circuit and the smoothing capacitor module are housed in a single cabinet.

9. A power conversion device according to claim 8, wherein:
the control circuit and the driver circuit are also housed in the cabinet.

10. A power conversion device according to claim 1, wherein:
the control circuit controls operations of the switching devices so that a first interval, in which all upper arms or all lower arms of the U phase, the V phase or the W phase of the inverter circuit are in continuous states, and a second interval, in which the upper arm or the lower arm is in a continuous state for one phase of the U phase, the V phase or the W phase, and, for the other two phases, the upper arms or the lower arms, which are not in continuous states for the one phase, are in continuous states, exist alternately.

11. A power conversion device, comprising:
an inverter circuit that includes a plurality of switching devices each operating as an upper arm or a lower arm, and that receives DC power from a battery and generates AC power for driving a motor;
a control circuit that receives a torque command for driving the motor and generates a control signal for controlling the switching devices; and
a driver circuit that drives the switching devices based upon the control signal from the control circuit wherein:
the inverter circuit comprises upper arm and lower arm series circuits that include the switching devices in correspondence to U phase, V phase and W phase and that are connected to a U phase AC power line, a V phase AC power line-and a W phase AC power line for supplying the AC power to the motor, respectively;
the control circuit receives the torque command for the motor and generates the control signal for setting each of the switching devices to a continuous state in correspondence to an electrical angle of AC voltage for driving the motor;
the driver circuit controls switching operations of the switching devices; and
by controlling the switching operations of the switching devices, current is supplied from the battery to any two of the U phase AC power line, the V phase AC power line and the W phase AC power line a plurality of times a half period of the AC voltage, in correspondence to a predetermined electrical angle of the AC voltage.

* * * * *